(12) United States Patent
Nakano et al.

(10) Patent No.: US 11,128,177 B2
(45) Date of Patent: *Sep. 21, 2021

(54) ELECTRONIC UNIT AND FEED SYSTEM

(71) Applicant: Sony Corporation, Tokyo (JP)

(72) Inventors: Hiroaki Nakano, Kanagawa (JP); Toru Terashima, Kanagawa (JP); Keigo Bunsen, Kanagawa (JP); Shinichi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,515

(22) Filed: Dec. 23, 2019

(65) Prior Publication Data

US 2020/0136437 A1 Apr. 30, 2020

Related U.S. Application Data

(63) Continuation of application No. 16/002,264, filed on Jun. 7, 2018, now Pat. No. 10,547,213, which is a
(Continued)

(30) Foreign Application Priority Data

Apr. 8, 2013 (JP) .............................. JP2013-080431
Sep. 11, 2013 (JP) .............................. JP2013-188057

(51) Int. Cl.
*H01M 10/46* (2006.01)
*H02J 50/12* (2016.01)
(Continued)

(52) U.S. Cl.
CPC .............. *H02J 50/12* (2016.02); *H02J 50/40* (2016.02); *H02J 50/60* (2016.02); *H02J 50/80* (2016.02)

(58) Field of Classification Search
CPC .. H02J 50/12; H02J 50/40; H02J 50/60; H02J 50/80; H02J 7/00045; H02J 7/00308; H02J 7/0049; H02J 7/1461
(Continued)

(56) References Cited

U.S. PATENT DOCUMENTS 5,808,447 A 9/1998 Hagino
9,455,593 B2 9/2016 Nakano et al.
(Continued)

FOREIGN PATENT DOCUMENTS

GN 102763306 A 10/2012
JP 2004-166323 A 3/1998
(Continued)

OTHER PUBLICATIONS

Japanese Office Action dated Dec. 12, 2017 for corresponding Japanese Application No. 2016-205384.
(Continued)

*Primary Examiner* — Edward Tso
(74) *Attorney, Agent, or Firm* — Michael Best & Friedrich LLP

(57) ABSTRACT

An electronic unit includes: a power receiving section configured to receive electric power fed from a feed unit by using a magnetic field; and a control section configured to perform, when a receiving current supplied from the power receiving section is less than a predetermined threshold current at a time of a light load, current increasing control to increase the receiving current to the threshold current or more.

14 Claims, 18 Drawing Sheets

Related U.S. Application Data continuation of application No. 15/230,878, filed on Aug. 8, 2016, now Pat. No. 10,027,176, which is a continuation of application No. 14/212,346, filed on Mar. 14, 2014, now Pat. No. 9,455,593.

(51) Int. Cl.
*H02J 50/40* (2016.01)
*H02J 50/60* (2016.01)
*H02J 50/80* (2016.01)

(58) Field of Classification Search
USPC .............. 320/107, 108, 127, 128, 132, 149
See application file for complete search history.

(56) References Cited

U.S. PATENT DOCUMENTS

| | | | |
|---|---|---|---|
| 10,547,213 B2 * | 1/2020 | Nakano | H02J 50/12 |
| 2009/0146616 A1 | 6/2009 | Breton et al. | |
| 2011/0163608 A1 | 7/2011 | Brohlin et al. | |
| 2014/0139218 A1 | 5/2014 | Findeklee et al. | |
| 2014/0300189 A1 | 10/2014 | Nakano et al. | |

FOREIGN PATENT DOCUMENTS

| | | |
|---|---|---|
| JP | H10-070856 | 3/1998 |
| JP | 2001-102974 A | 4/2001 |
| JP | 2002-034169 A | 1/2002 |
| JP | 2005-110399 A | 4/2005 |
| JP | 2006-222278 A | 8/2005 |
| JP | 2008-206233 A | 9/2008 |
| JP | 2008-236815 A | 10/2008 |
| JP | 2010-028937 A | 2/2010 |
| JP | 2010-063245 A | 3/2010 |
| JP | 2012-514896 | 6/2012 |
| WO | WO-00/27531 | 5/2000 |

OTHER PUBLICATIONS

Japanese Office Action dated Aug. 29, 2017 for corresponding Japanese Application No. 2016-205384.
Chinese Office Action dated May 26, 2017 for corresponding Chinese Application No. 201410128791.6.
Chinese Office Action dated May 31, 2021 for corresponding Chinese Application No. 2018111095766.

* cited by examiner

| Vdc (V) | Vref (V) | Ith (mA) | LOAD RESISTANCE VALUE (Ω) |
|---|---|---|---|
| 3 | 0.25 | 25 | 120 |
| 6 | 0.50 | 50 | 120 |
| 12 | 1.00 | 100 | 120 |
| 24 | 2.00 | 200 | 120 |

ELECTRONIC UNIT AND FEED SYSTEM

CROSS REFERENCE TO RELATED APPLICATIONS

This application is a Continuation Application of U.S. patent application Ser. No. 16/002,264, filed Jun. 7, 2018, which is a Continuation Application of U.S. patent application Ser. No. 15/230,878, filed Aug. 8, 2016, now U.S. Pat. No. 10,027,176, issued on Jul. 17, 2018, which is a Continuation Application of U.S. patent application Ser. No. 14/212,346, filed Mar. 14, 2014, now U.S. Pat. No. 9,455,593, issued on Sep. 27, 2016, which claims the benefit of Japanese Priority Patent Application Nos.: 2013-080431 filed Apr. 8, 2013, and 2013-188057 filed Sep. 11, 2013, the entire contents of each of which are incorporated herein by reference.

BACKGROUND

The present disclosure relates to a feed system that performs non-contact electric power supply (feeding, or power transmission) to a unit to be fed such as an electronic unit. The present disclosure also relates to an electronic unit applied to such a feed system.

In recent years, attention has been given to a feed system (such as a non-contact feed system and a wireless charging system) that performs non-contact electric power supply to a CE device (Consumer Electronics Device) such as a mobile phone and a portable music player. This makes it possible to start charging merely by placing an electronic unit (a secondary-side unit) on a charging tray (a primary-side unit), instead of starting charging by inserting (connecting) a connector of a power-supply such as an AC adapter into the unit. In other words, terminal connection between the electronic unit and the charging tray becomes unnecessary.

Methods of thus performing non-contact power supply are broadly classified into two types of methods. A first method is an electromagnetic induction method that has been already widely known. In this method, a degree of coupling between a power transmission side (a primary side) and a power receiving side (a secondary side) is considerably high and therefore, high-efficiency feeding is possible. A second method is a method called a magnetic resonance method. This method has such a characteristic that a magnetic flux shared by the power transmission side and the power receiving side may be small due to positive utilization of a resonance phenomenon.

Here, such non-contact feed systems are disclosed in WO 00/27531, as well as Japanese Unexamined Patent Application Publication Nos. 2001-102974, 2008-206233, 2002-34169, 2005-110399, and No. 2010-63245, for example.

SUMMARY

In the non-contact feed systems as described above, in general, a load in an electronic unit to be fed fluctuates according to the situation of feeding and charging. Therefore, it is expected to propose a method capable of performing appropriate control in response to a fluctuation of a load, when performing feeding by using a magnetic field.

It is desirable to provide an electronic unit and a feed system that are capable of performing appropriate control when performing feeding using a magnetic field.

According to an embodiment of the present disclosure, there is provided an electronic unit including: a power receiving section configured to receive electric power fed from a feed unit by using a magnetic field; and a control section configured to perform, when a receiving current supplied from the power receiving section is less than a predetermined threshold current at a time of a light load, current increasing control to increase the receiving current to the threshold current or more.

According to an embodiment of the present disclosure, there is provided a feed system provided with one or a plurality of electronic units and a feed unit configured to feed the electronic units by using a magnetic field. Each of the electronic units includes: a power receiving section configured to receive electric power fed from the feed unit; and a control section configured to perform, when a receiving current supplied from the power receiving section is less than a predetermined threshold current at a time of a light load, current increasing control to increase the receiving current to the threshold current or more.

In the electronic unit and the feed system according to the above-described respective embodiments of the present disclosure, when the receiving current at the time of the light load is less than the predetermined threshold current, the current increasing control is performed to increase the receiving current to the threshold current or more. This allows a receiving voltage to be readily controlled in an appropriate manner, even at the time of the light load.

According to the electronic unit and the feed system of the above-described respective embodiments of the present disclosure, when the receiving current at the time of the light load is less than the predetermined threshold current, the current increasing control is performed to increase the receiving current to the threshold current or more. Therefore, even at the time of the light load, the receiving voltage is allowed to be controlled readily in an appropriate manner. Hence, appropriate control is allowed to be performed when feeding using a magnetic field is performed. It is to be noted that effects are not limited to those described here, and may include every effect described in the present disclosure.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to describe the principles of the technology.

DETAILED DESCRIPTION

An embodiment of the present disclosure will be described below in detail with reference to the drawings. It is to be noted that the description will be provided in the following order.
1. Embodiment (an example of a case in which a receiving current is increased utilizing a dummy load)
2. Modifications
  Modification 1 (an example of a case in which disconnection of a dummy load is determined according to a magnitude of a receiving current)
  Modification 2 (an example of a case in which selection from a plurality of types of dummy loads is performed according to a magnitude of a receiving current, and the selected type of dummy load is utilized)
  Modifications 3 and 4 (examples of a case in which a receiving current is increased using a comparator and an integrator)
3. Other modifications Embodiment

[Overall Configuration of Feed System 4]

Figure 1:
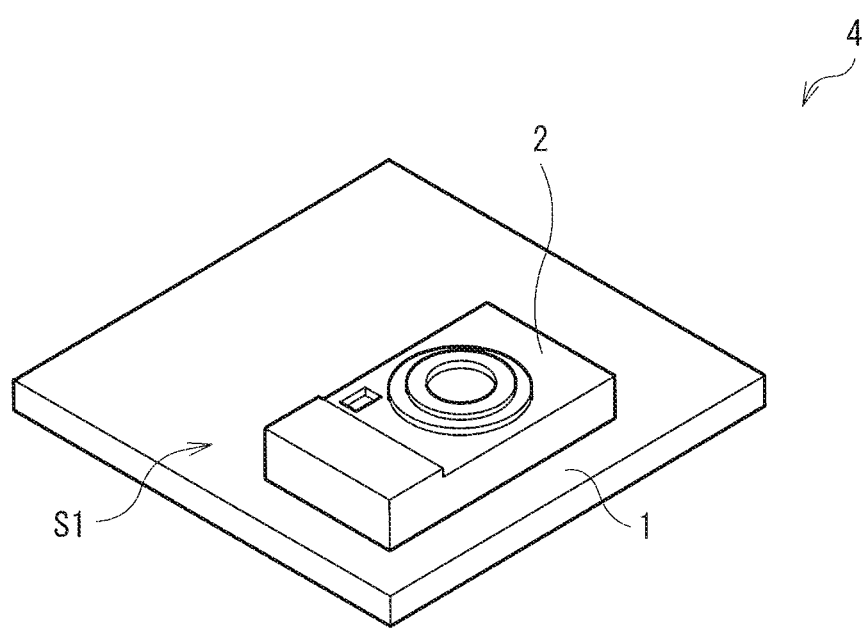
FIG. 1 is a perspective view illustrating an appearance configuration example of a feed system according to an embodiment of the present disclosure.
Figure 2:
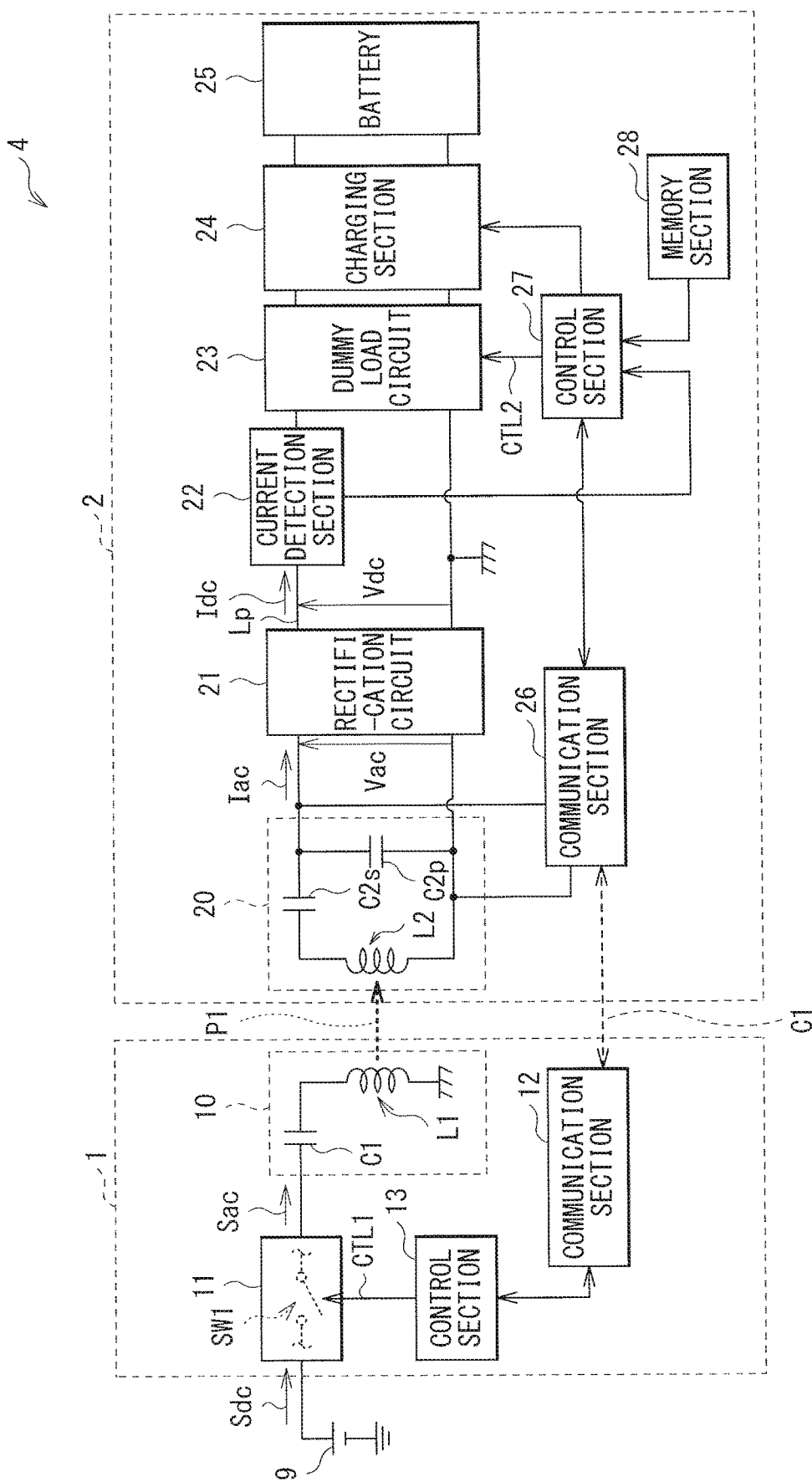
FIG. 2 is a diagram illustrating a detailed configuration example of the feed system illustrated in FIG. 1.

FIG. 1 illustrates an appearance configuration example of a feed system (a feed system 4) according to an embodiment of the present disclosure, and FIG. 2 illustrates a detailed configuration example of the feed system 4, by using a block diagram and a circuit diagram. The feed system 4 is a system (a non-contact type feed system) that performs electric power transmission (power supply, feeding, or power transmission) in a non-contact manner by using a magnetic field (by utilizing magnetic resonance, electromagnetic induction, or the like; likewise hereinafter). The feed system 4 includes a feed unit 1 (a primary-side unit) and a plurality of electronic units (here, one electronic unit 2; a secondary-side unit) serving as a unit to be fed.

In the feed system 4, electric power transmission from the feed unit 1 to the electronic unit 2 may be performed by placing the electronic unit 2 on (or, in proximity to) a feeding surface (a power transmission surface) S1 in the feed unit 1, as illustrated in FIG. 1, for example. Here, as an example, the feed unit 1 is shaped like a mat (a tray) in which the area of the feeding surface S1 is larger than the electronic unit 2 to be fed.

(Feed Unit 1)

The feed unit 1 is a unit (a charging tray) that performs the feeding to the electronic unit 2 by using a magnetic field as described above. The feed unit 1 may include a power transmission section 10, an AC (alternating-current) signal generating circuit (an AC signal generating section, or a high-frequency power generating circuit) 11, a communication section 12, and a control section 13, as illustrated in FIG. 2, for example.

The power transmission section 10 may include, for example, a power transmission coil (a primary-side coil) L1, a capacitor C1 (a capacitor for resonance), and the like. The power transmission coil L1 and the capacitor C1 are electrically connected in series to each other. Specifically, one end of the power transmission coil L1 is connected to one end of the capacitor C1, and the other end of the power transmission coil L1 is grounded. The other end of the capacitor C1 is connected to an output terminal of the AC signal generating circuit 11. The power transmission section 10 performs feeding by utilizing an AC magnetic field to the electronic unit 2 (specifically, a power receiving section 20 that will be described later), by utilizing the power transmission coil L1 and the capacitor C1 (see an arrow P1 in FIG. 2). Specifically, the power transmission section 10 has a function of emitting a magnetic field (a magnetic flux) from the feeding surface S1 towards the electronic unit 2.

Further, in the power transmission section 10, an LC resonance circuit is configured using the power transmission coil L1 and the capacitor C1. The LC resonance circuit formed in the power transmission section 10 and an LC resonance circuit formed in the power receiving section 20 that will be described later are magnetically coupled to each other (mutual induction).

The AC signal generating circuit 111 may be, for example, a circuit that generates a predetermined AC signal Sac (high-frequency electric power) used to perform feeding, by using electric power (a direct-current (DC) signal Sdc) supplied from an external power source 9 (a host power source) of the feed unit 1. The AC signal Sac is supplied towards the power transmission section 10. It is to be noted that examples of the external power source 9 may include an ordinary AC adapter, and a USB (Universal Serial Bus) 2.0 power source (power supply ability: 500 mA, and power supply voltage: about 5 V) provided in a PC (Personal Computer), etc.

As will be described later, for example, the AC signal generating circuit 11 as described above may be configured using a switching amplifier (a so-called class E amplifier, a differential amplifier, or the like) including one or a plurality of switching elements SW1 that are MOS (Metal Oxide Semiconductor) transistors and/or the like. Further, a control signal CTL for feeding is supplied from the control section 13 to the switching element SW1. It is to be noted that a detailed configuration of the AC signal generating circuit 11 will be described later.

The communication section 12 performs predetermined mutual communication operation with a communication section 26 in the electronic unit 2 (see an arrow C1 in FIG. 2). The communication section 26 will be described later.

The control section 13 performs various kinds of control operation in the entire feed unit 1 (the entire feed system 4). Specifically, other than controlling the power transmission operation performed by the power transmission section 10 and the communication operation performed by the communication section 12, the control section 13 may have, for example, a function of controlling optimization of feeding power and authenticating a unit to be fed. The control section 13 may further have a function of detecting the unit to be fed located in the proximity of the feed unit 1, and a function of detecting a mixture such as dissimilar metal, etc. Here, when performing the above-described control of the feeding operation, the control section 13 controls operation of the AC signal generating circuit 11, by using the control signal CTL described above. The control section 13 as described above may be configured using, for example, a microcomputer, a pulse generator, or the like. It is to be noted that the operation of controlling the AC signal generating circuit 11 by the control section 13 will be described later in detail.

(Electronic Unit 2)

The electronic unit 2 may be, for example, any of stationary electronic units represented by television receivers, portable electronic units containing a rechargeable battery represented by mobile phones and digital cameras, and the like. As illustrated in, for example, FIG. 2, the electronic unit 2 may include the power receiving section 20, a rectification circuit 21, a current detection section 22, a dummy load circuit 23, a charging section 24, a battery 25, the communication section 26, a control section 27, and a memory section 28. It is to be noted that the dummy load circuit 23 corresponds to a specific but not limitative example of "current increasing section" in the present disclosure.

The power receiving section 20 includes a power receiving coil (a secondary-side coil) L2 as well as capacitors C2s and C2p (capacitors for resonance). The power receiving coil L2 and the capacitor C2s are electrically connected in series to each other, whereas the power receiving coil L2 and the capacitor C2p are electrically connected in parallel to each other. Specifically, one end of the capacitor C2s is connected to one input terminal of the rectification circuit 21 and one end of the capacitor C2p. The other end of the capacitor C2s is connected to one end of the power receiving coil L2. The other end of the power receiving coil L2 is connected to the other input terminal of the rectification circuit 21 and the other end of the capacitor C2p. The power receiving section 20 has a function of receiving electric power (feeding power) transmitted from the power transmission section 10 in the feed unit 1, by utilizing the power receiving coil L2, the capacitors C2s and C2p, and the like.

Further, in the power receiving section 20, an LC resonance circuit is configured using the power receiving coil L2 as well as the capacitors C2s and C2p. As described above, the LC resonance circuit formed in the power receiving section 20 and the above-described LC resonance circuit formed in the power transmission section 10 are magnetically coupled to each other. As a result, LC resonance operation is performed based on a resonance frequency that is substantially the same as that of the high-frequency electric power (the AC signal Sac) generated by the AC signal generating circuit 11.

The rectification circuit 21 rectifies a receiving voltage (an AC voltage) supplied from the power receiving section 20, and generates a DC voltage. In other words, the rectification circuit 21 rectifies an AC receiving current (an AC receiving current Iac) and an AC receiving voltage (an AC receiving voltage Vac) supplied from the power receiving section 20, and generates a DC receiving current (a DC receiving current Idc) and a DC receiving voltage (a DC receiving voltage Vdc). The rectification circuit 21 may be, for example, a circuit having a bridge configuration using a plurality of rectifiers (diodes). It is to be noted that the rectification circuit 21 may be, for example, a synchronous rectification circuit using a transistor.

The current detection section 22 detects the receiving current supplied from the power receiving section 20. In this example, in particular, the current detection section 22 is provided on a subsequent stage side of the rectification circuit 21 on a power supply line Lp, to detect the receiving current (the DC receiving current Idc) after the rectification by the rectification circuit 21. The DC receiving current Idc thus detected is outputted to the control section 27. It is to be noted that, for example, the current detection section 22 as described above may be configured using a resistor, a current transformer, etc.

The dummy load circuit 23 is disposed between the rectification circuit 21 and the charging section 24 on the power supply line Lp, and includes one or a plurality of dummy loads (such as dummy resistors). When a predetermined condition described later is satisfied, the dummy load circuit 23 performs operation (current increasing operation) of increasing the receiving current (the DC receiving current Idc, in this example), according to control by (a control signal CTL2 from) the control section 27. It is to be noted that a detailed configuration of the dummy load circuit 23 and details of the current increasing operation will be described later.

Based on DC power outputted from the rectification circuit 21, the charging section 24 performs charging operation of charging the battery 25 serving as a main load.

The battery 25 stores electric power according to the charging operation performed by the charging section 24, and may be configured using, for example, a rechargeable battery (a secondary battery) such as a lithium ion battery.

The communication section 26 performs the above-described predetermined mutual communication operation with the communication section 12 in the feed unit 1 (see the arrow C1 in FIG. 2).

The control section 27 performs various kinds of control operation in the entire electronic unit 2 (the entire feed system 4). Specifically, other than controlling the power receiving operation by the power receiving section 20 and the communication operation performed by the communication section 26, the control section 27 may have, for example, a function of controlling optimization of receiving power and controlling the charging operation of the charging section 24.

Here, in the present embodiment, the control section 27 performs current increasing control as will be described below, in a case where the receiving current (the DC receiving current Idc) detected by the current detection section 22 is less than a predetermined threshold current Ith (Idc<Ith), at the time of a light load that will be described later. Specifically, in such a case, the control section 27 performs the current increasing control so that the DC receiving current Idc increases to the threshold current Ith or more (Idc Ith). To be more specific, for example, the control section 27 may perform such current increasing control, by using one or more of the dummy loads in the dummy load circuit 23 described above. The control section 27 as described above may be configured using, for example, a microcomputer. It is to be noted that the current increasing control operation by the control section 27 will be described later in detail.

The memory section 28 is provided to store therein various kinds of information used in the control section 27. Specifically, the memory section 28 may store therein, for example, information about the above-described threshold current Ith.

[Detailed Configuration Example of AC Signal Generating Circuit 11]

Figure 3:
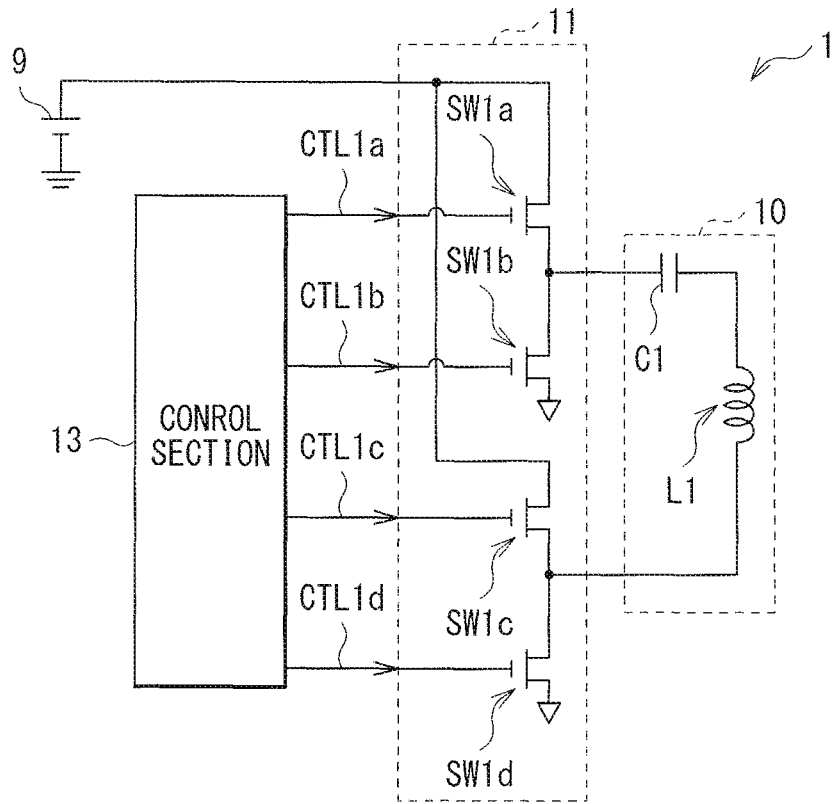
FIG. 3 is a circuit diagram illustrating a detailed configuration example of an AC signal generating circuit illustrated in FIG. 2.

Next, a detailed configuration example of the above-described AC signal generating circuit 11 will be described with reference to FIGS. 3, 4, 5A, and 5B. FIG. 3 illustrates a circuit configuration example of the AC signal generating circuit 11, together with the external power source 9, the power transmission section 10, and the control section 13.

In this example, the AC signal generating circuit 11 has a bridge circuit configuration using four switching elements SW1a, SW1b, SW1c, and SW1d as the above-described switching element SW1. Further, the switching elements SW1a, SW1b, SW1c, and SW1d each are configured of a MOS transistor in this example. In the AC signal generating circuit 11, the switching elements SW1a, SW1b, SW1c, and SW1d have respective gates to which control signals CTL1a, CTL1b, CTL1c, and CTL1d, respectively, are inputted individually as the above-described control signal CTL1. A connection line from the external power source 9 is connected to a source of each of the switching elements SW1a and SW1c. A drain of the switching element SW1a is connected to a drain of the switching element SW1b, and a drain of the switching element SW1c is connected to a drain of the switching element SW1d. The switching elements SW1b and SW1d have respective sources connected to a ground (grounded). Furthermore, the switching elements SW1a and SW1b have respective drains connected to one end of the capacitor C1 in the power transmission section 10, and the switching elements SW1c and SW1d have respective drains connected to one end of the power transmission coil L1 in the power transmission section 10.

Figure 4:
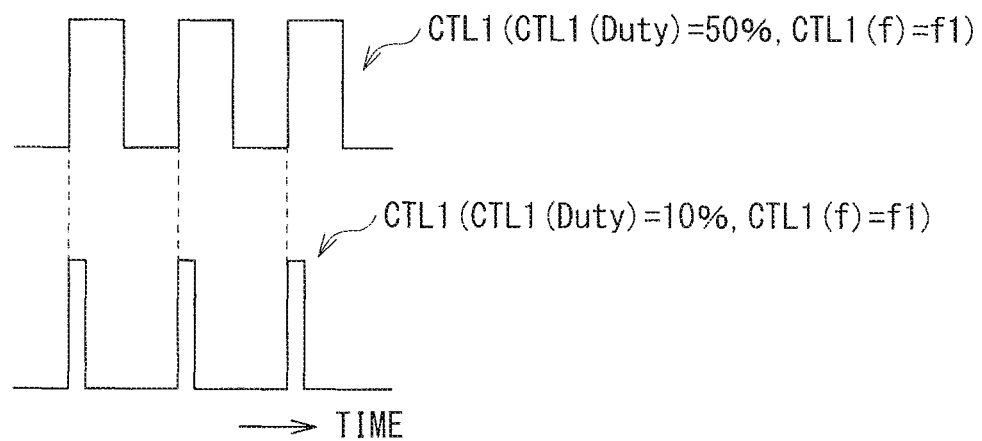
FIG. 4 is a timing waveform diagram illustrating an example of a control signal for the AC signal generating circuit.

Here, the above-described control signal CTL1 (CTL1a, CTL1b, CTL1c, and CTL1d) may be a pulse signal indicating a predetermined frequency f (CTL1 (f)=f1) and a duty ratio Duty (CTL1 (Duty)=10%, 50%, etc.), as illustrated in FIG. 4, for example. Further, as illustrated in FIG. 4, pulse width modulation (PWM) is performed by controlling the duty ratio Duty in the control signal CTL1.

In the AC signal generating circuit 11, with such a configuration, the switching elements SW1a, SW1b, SW1c, and SW1d each perform ON/OFF operation (switching operation based on the frequency f and the duty ratio Duty) according to the control signals CTL1a, CTL1b, CTL1c, and CTL1d. In other words, the ON/OFF operation of the switching element SW1 is controlled using the control signal CTL1 supplied from the control section 13. As a result, for example, the AC signal Sac may be generated based on the DC signal Sdc inputted from the external power source 9 side, and the generated AC signal Sac may be supplied to the power transmission section 10.

Further, in the AC signal generating circuit 11, it is possible to switch the circuit configuration between a full-bridge circuit and a half-bridge circuit in the following manner, according to the control signals CTL1a, CTL1b, CTL1c, and CTL1d. This makes it possible to change a voltage in feeding, based on control of the switching operation, without changing a hardware configuration.

Figure 5A:
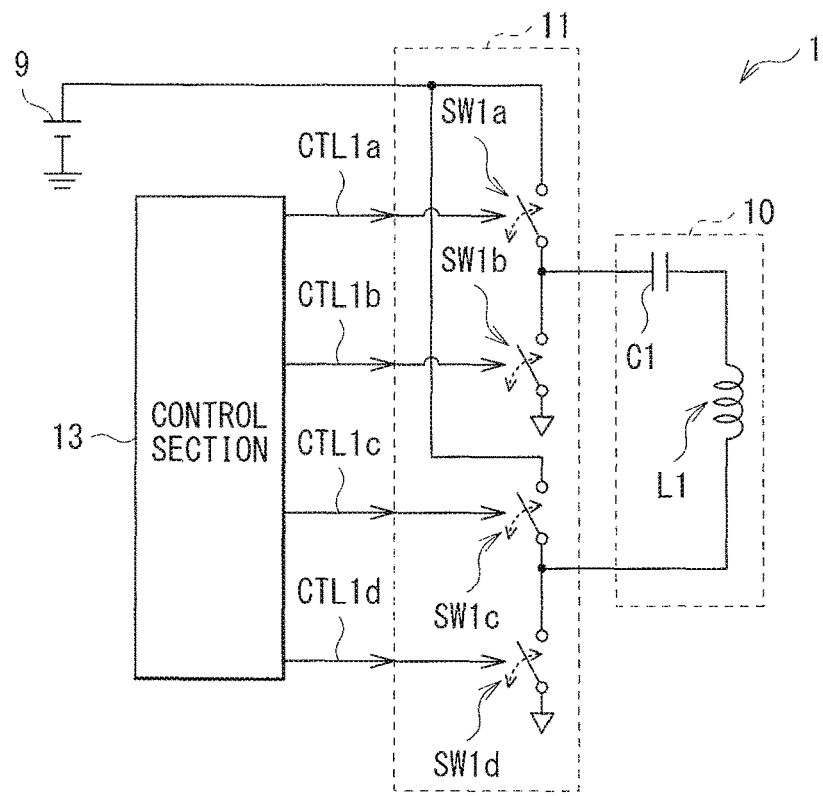
FIG. 5A is a circuit diagram schematically illustrating an operation example of the AC signal generating circuit illustrated in FIG. 3.

Specifically, for example, as illustrated in FIG. 5A, the configuration of the full-bridge circuit may be used when the four switching elements SW1a, SW1b, SW1c, and SW1d each perform the ON/OFF operation.

Figure 5B:
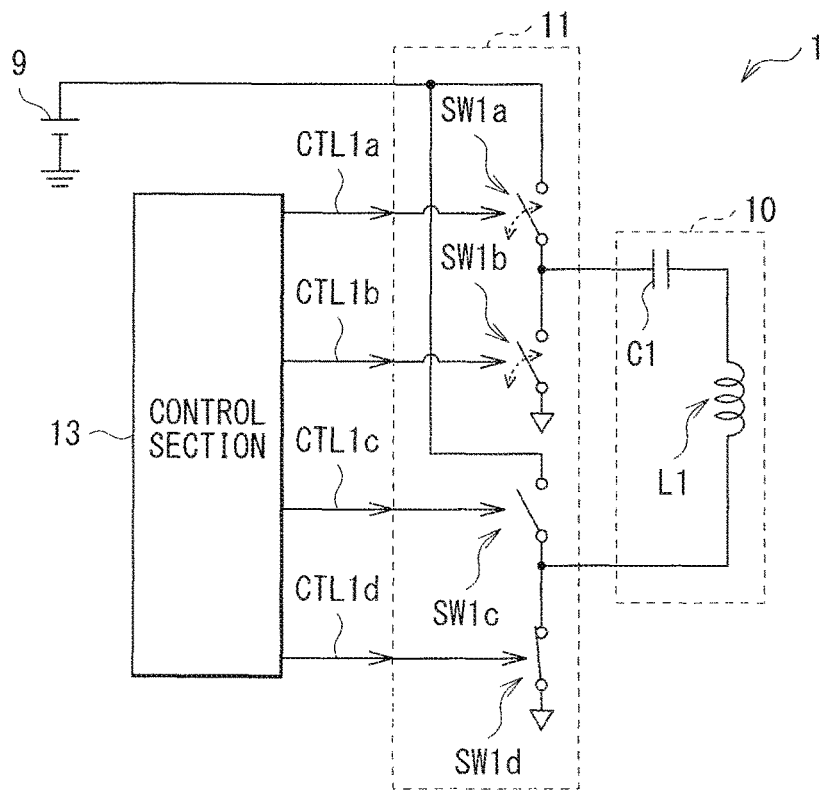
FIG. 5B is a circuit diagram schematically illustrating another operation example of the AC signal generating circuit illustrated in FIG. 3.

Further, as illustrated in FIG. 5B, for example, there may be a case in which, while the two switching elements SW1a and SW1b each perform the ON/OFF operation, the switching element SW1c is typically in an OFF state and the switching element SW1d is typically in an ON state. This is equivalent to the configuration of the half-bridge circuit including the two switching elements SW1a and SW1b. Therefore, in this case, a voltage (a feeding voltage) generated by the AC signal generating circuit 11 in feeding is about half of that in the case of the full-bridge circuit illustrated in FIG. 5A. It is to be noted that FIGS. 5A and 5B as well as subsequent similar drawings schematically illustrate each of the switching elements in the form of a switch, for easy understanding of an operating state thereof.

[Detailed Configuration Example of Dummy Load Circuit 23]

Figure 6:
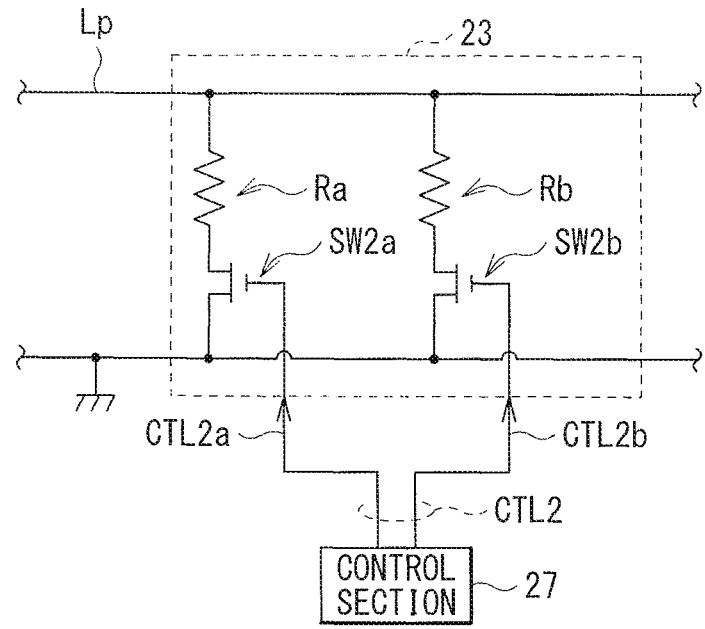
FIG. 6 is a circuit diagram illustrating a detailed configuration example of a dummy load circuit illustrated in FIG. 2.

Next, a detailed configuration example of the above-described dummy load circuit 23 will be described with reference to FIGS. 6 and 7. FIG. 6 illustrates a circuit configuration example of the dummy load circuit 23, together with the control section 27.

In this example, the dummy load circuit 23 includes two dummy loads Ra and Rb each being a resistor (a dummy resistor), and two switching elements SW2a and SW2b each being configured of a MOS transistor. The dummy load Ra and the switching element SW2a are connected in series to each other between the power supply line Lp and a ground line. The dummy load Rb and the switching element SW2b are connected in series to each other between the power supply line Lp and the ground line. Specifically, one end of the dummy load Ra is connected to the power supply line Lp, the other end of the dummy load Ra is connected to a drain of the switching element SW2a, and a source of the switching element SW2a is connected to the ground line. Similarly, one end of the dummy load Rb is connected to the power supply line Lp, the other end of the dummy load Rb is connected to a drain of the switching element SW2b, and a source of the switching element SW2b is connected to the ground line. Further, a pair of the dummy load Ra and the switching element SW2a are arranged in parallel with a pair of the dummy load Rb and the switching element SW2b. Furthermore, the control signals CTL2a and CTL2b are individually inputted as the above-described control signal CTL2, to gates of the switching elements SW2a and SW2b, respectively.

With such a configuration, in the dummy load circuit 23, the two switching elements SW2a and SW2b are individually set to be in an ON state or in an OFF state, according to the control signals CTL2a and CTL2b, respectively, supplied from the control section 27. As a result, in the dummy load circuit 23, the two dummy loads Ra and Rb are individually connected or not connected to a point in a supply path (between the power supply line Lp and the ground line) of the DC receiving current Idc.

Figure 7:
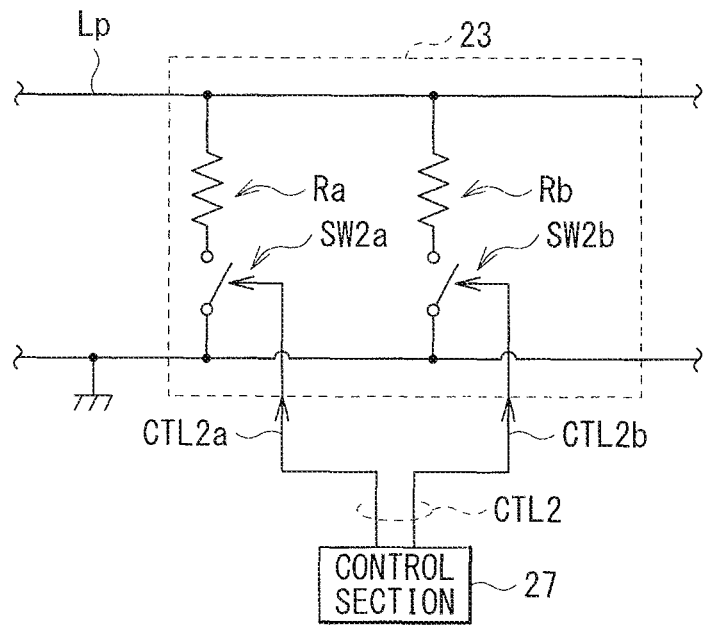
FIG. 7 is a circuit diagram schematically illustrating a state example of the dummy load circuit illustrated in FIG. 6.

In is to be noted that, for example, as illustrated in FIG. 7, the switching elements SW2a and SW2b both may be set in the OFF state, at a time other than the above-described time of the light load (other than the case of satisfying (Idc<Ith), which will be described later). In other words, the dummy loads Ra and Rb are both set not to be connected to the points in the supply path of the DC receiving current Idc.

[Functions and Effects of Feed System 4]
(1. Summary of Entire Operation)

In the feed system 4, the predetermined high-frequency electric power (the AC signal Sac) used to perform the electric power transmission is supplied by the AC signal generating circuit 11 in the feed unit 1, to the power transmission coil L1 and the capacitor C1 in the power transmission section 110. This supply is based on the electric power supplied from the external power source 9. As a result, a magnetic field (a magnetic flux) occurs in the power transmission coil L1 in the power transmission section 10. At this moment, when the electronic unit 2 serving as the unit to be fed is placed on (or, in proximity to) the top surface (the feeding surface S1) of the feed unit 1, the power transmission coil L1 in the feed unit 1 and the power receiving coil L2 in the electronic unit 2 are in proximity to each other in the vicinity of the feeding surface S1.

In this way, when the power receiving coil L2 is placed in proximity to the power transmission coil L1 generating the magnetic field, an electromotive force (an induced electromotive force) is generated in the power receiving coil L2 by being induced by the magnetic flux generated by the power transmission coil L1. In other words, due to electromagnetic induction or magnetic resonance, the magnetic field is generated by forming interlinkage with each of the power transmission coil L1 and the power receiving coil L2. As a result, electric power is transmitted from the power transmission coil L1 side (a primary side, the feed unit 1 side, or the power transmission section 10 side) to the power receiving coil L2 side (a secondary side, the electronic unit 2 side, or the power receiving section 210 side) (see the arrow P1 in FIG. 2). At this moment, the power transmission coil L1 on the feed unit 1 side and the power receiving coil L2 on the electronic unit 2 side are magnetically coupled to each other by electromagnetic induction or the like, and the LC resonance operation is performed.

Then, in the electronic unit 2, the AC power received by the power receiving coil L2 is supplied to the charging section 24 through the rectification circuit 21, and the charging operation is performed as follows. First, an AC voltage (AC current) is converted into a predetermined DC voltage (DC current) by the rectification circuit 21. Then, the charging of the battery 25 based on the DC voltage is performed by the charging section 24. In this way, the charging operation based on the electric power received by the power receiving section 210 is performed in the electronic unit 2.

In other words, in the present embodiment, at the time of charging the electronic unit 2, terminal connection to an AC adapter or the like, for example, is unnecessary, and it is possible to start the charging easily by merely placing the electronic unit 2 on (or in proximity to) the feeding surface S1 of the feed unit 1 (non-contact feeding is performed). This reduces burden on a user.

Moreover, in such operation, the mutual communication operation is performed between the communication section 12 in the feed unit 1 and the communication section 26 in the electronic unit 2 (see the arrow C1 in FIG. 2). Therefore, for example, mutual authentication between the units, and feeding efficiency control are performed.

(2. Receiving Current at Light Load)

Meanwhile, in the feed unit 1 of the present embodiment, feeding-power control using the above-described PWM control is performed in the AC signal generating circuit 11 (see FIG. 4). However, when such feeding-power control using the PWM control is performed, the receiving power may not be appropriately controlled in the electronic unit 2 at the time of the light load.

It is to be noted that, in the PWM control, in general, changing a phase difference of input to a switching element is equivalent to changing a duty ratio. For example, when the phase difference of input is 90 degrees, this may be equivalent to the duty ratio of 25%.

Figure 8:
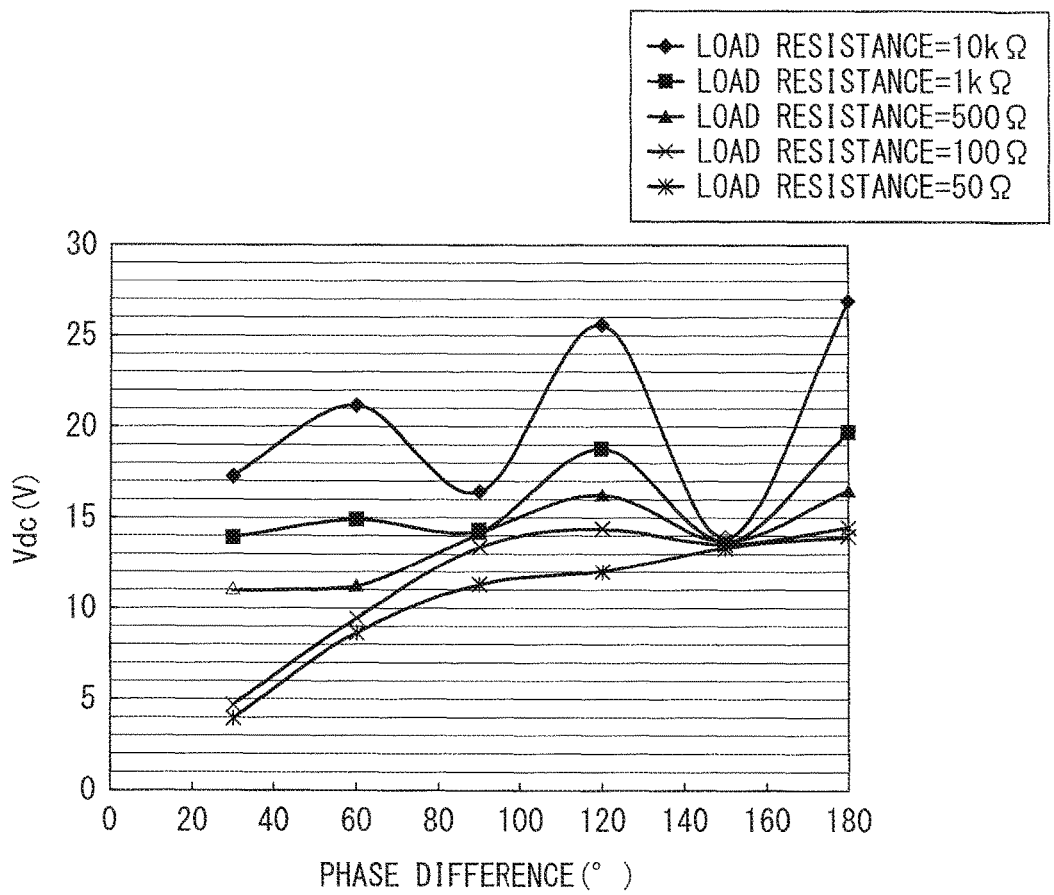
FIG. 8 is a characteristic diagram illustrating an example of a relationship between a phase difference, and a receiving voltage as well as a load resistance, in the AC signal generating circuit.

Here, FIG. 8 illustrates an example of a relationship between a phase difference of input to the switching elements SW1a to SW1d in the AC signal generating circuit 11, and the DC receiving voltage Vdc as well as a load resistance in the electronic unit 2. As illustrated in FIG. 8, when a certain amount of current (the DC receiving current Idc) flows in the electronic unit 2 (when a value of the load resistance is small to some extent), the DC receiving voltage Vdc becomes small as the phase difference becomes small. In other words, in such a case, there is a monotone decreasing relationship between the phase difference and the DC receiving voltage Vdc. However, when the current flowing in the electronic unit 2 decreases (when the value of the load resistance increases), this monotone decreasing relationship disappears.

Figure 9:
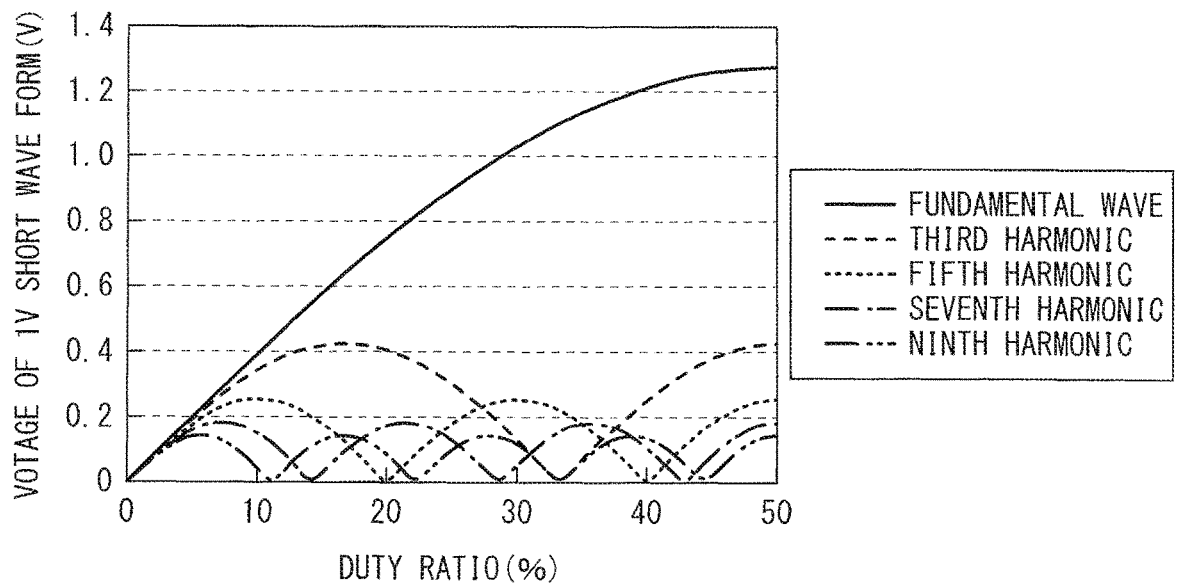
FIG. 9 is a characteristic diagram used to describe an influence of a harmonic.

This is because, when the DC receiving current Idc becomes small (if the load becomes light), this makes it easy to see a frequency component of multiple resonance in the electronic unit 2, which increases an influence of a harmonic. Specifically, for example, as illustrated in FIG. 9, ratios between a fundamental content and a harmonic content greatly differ depending on the duty ratio. While the duty ratio monotonously increases to 50% for the fundamental content, the duty ratio for the harmonic content does not monotonously increase. Therefore, for example, the ratio of a specific harmonic content in a fundamental wave may become high in some cases. In this way, in a case in which the multiple resonance occurs in the electronic unit 2, when the load becomes light (when the value of the DC receiving current Idc becomes small), the influence of a harmonic may increase. As a result, adjustment of the receiving voltage (the DC receiving voltage Vdc and the like) may become difficult in the feeding of the electric power based on the PWM control. In other words, the light load in the electronic unit 2 may bring the DC receiving voltage Vdc into an uncontrollable state, or cause the DC receiving voltage Vdc to become an overvoltage.

Here, in the feed system 4 of the present embodiment, the load in the electronic unit 2 to be fed fluctuates depending on the situation of the feeding and/or the charging, as will be described later. Therefore, it is desirable to perform appropriate control in response to fluctuation of the load, when the feeding is performed using a magnetic field. It is to be noted that in a case of control other than the feeding-power control using the PWM control, when the load in the electronic unit 2 is too light, it may be likewise difficult to adjust the receiving voltage (the DC receiving voltage Vdc and the like) due to a narrow voltage control range in the feed unit 1.

(3. Operation of Increasing Receiving Current)

Therefore, in the present embodiment, the above-described disadvantage is addressed in the following manner, in the electronic unit 2 serving as the secondary-side unit.

When the DC receiving current Idc detected by the current detection section 22 is less than the predetermined threshold current Ith (Idc<Ith) at the time of the light load, the control section 27 in the electronic unit 2 performs the following current increasing control. Specifically, in such a case, the control section 27 performs the current increasing control, to increase the DC receiving current Idc to the threshold current Ith or more (Idc Ith). To be more specific, the control section 27 performs such current increasing control, by using one or more of the dummy loads in the dummy load circuit 23. A series of steps in feeding and charging operation including such current increasing control will be described below in detail.

Here, for example, the following two periods each may be assumed to be "at the time of the light load" described above. First, there is a period before the battery 25 serving as the main load is connected (a period of preliminary feeding at the time of activation, which will be described later; a first period). Secondly, there is a period of the charging operation for the battery 25 based on main feeding that will be described later (for example, a period of almost full charge; a second period). This second period follows the connection of the battery 25.

Therefore, in the present embodiment, as will be described below in detail, it is determined whether a load is a light load (whether the DC receiving current Idc is less than the threshold current Ith) in both of the period of the preliminary feeding and the period of the charging operation. Further, as will be described later, it is periodically determined whether the load is a light load, in the period of the charging operation. When it is determined that the load is a light load, the above-described current increasing control is performed.

Figure 10:
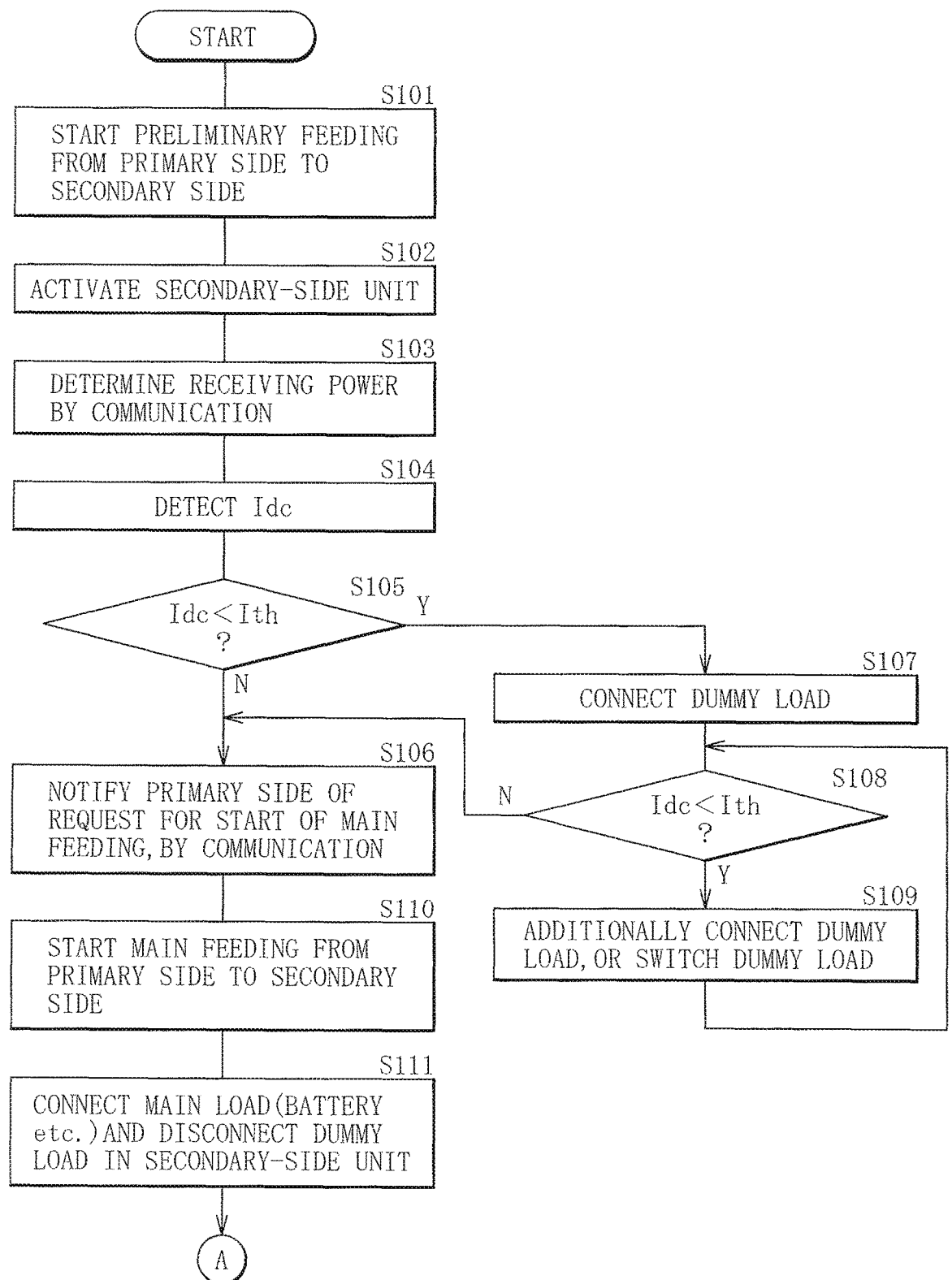
FIG. 10 is a flowchart illustrating an example of feeding and charging operation according to the embodiment.
Figure 11:
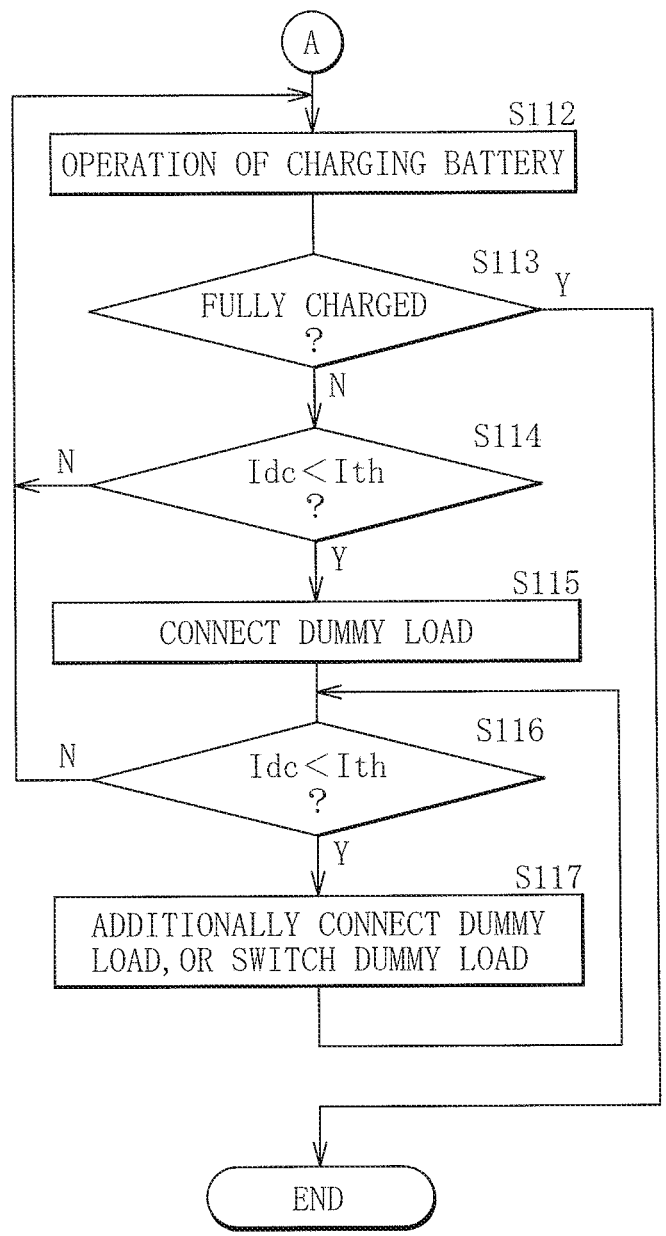
FIG. 11 is a flowchart illustrating an example of the feeding and charging operation following FIG. 10.

FIG. 10 and FIG. 11 each illustrate the feeding and charging operation of the present embodiment, by using a flowchart. In the feeding and charging operation, at first, the preliminary feeding begins (step S101 in FIG. 10). In the preliminary feeding, electric power lower than that in the main feeding is fed from the feed unit 1 to the electronic unit 2. The electronic unit 2 is activated using the receiving power obtained by this preliminary feeding (step S102).

Next, the receiving power in the main feeding is determined in the electronic unit 2 (the control section 27), by communication between the feed unit 1 and the electronic unit 2 (step S103). It is to be noted that, in this preliminary feeding, necessary feeding power is lower than that in the main feeding and therefore, the AC signal generating circuit 11 in the feed unit 1 is set to the half-bridge circuit.

Figure 12:
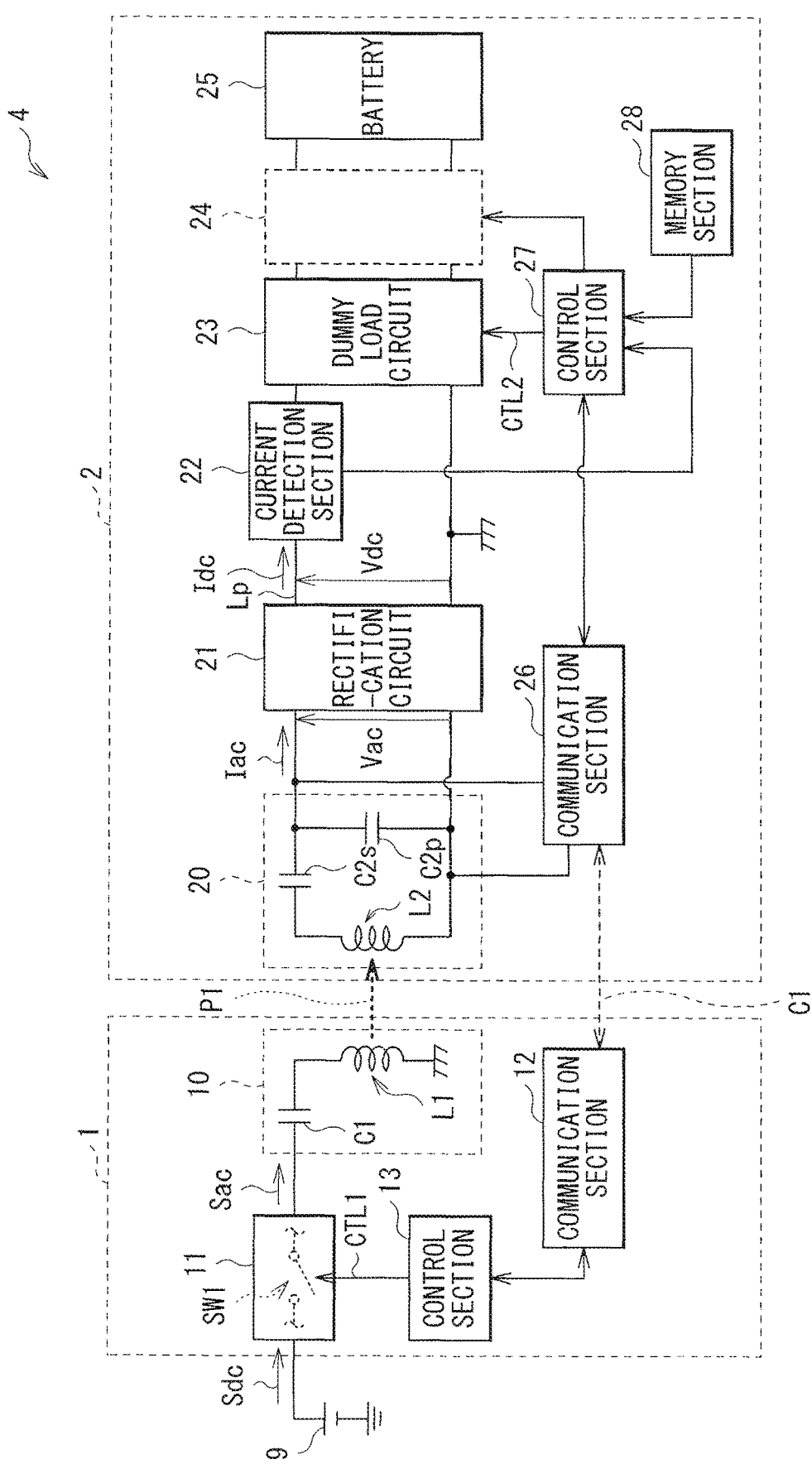
FIG. 12 is a diagram illustrating an example of an operating state in preliminary feeding.

Here, in such preliminary feeding, for example, as illustrated in FIG. 12, the charging section 24 is control to be in a non-operating state by the control section 27, which sets the main load (the battery 25 in this example) to a state of being not connected to the power supply line Lp.

Next, in the electronic unit 2, the current detection section 22 detects the DC receiving current Idc in the preliminary feeding (step S104), before notifying a request for start of the main feeding based on the receiving power determined in step S103 to the feed unit 1 side (step S106 to be described later). The control section 27 then determines whether the detected DC receiving current Idc is less than the predetermined threshold current Ith (Idc<Ith) (step S105). It is to be noted that the DC receiving current Idc in the preliminary feeding may be estimated beforehand as a consumption current in an integrated circuit (IC), unlike the charging operation that will be described later. Therefore, in steps S104 and S105 described above, a value thus estimated and set beforehand may be read from the memory section 28, for example, and used in place of the current detected by the current detection section 22.

The threshold current Ith is set to be a current value that avoids a possibility of the receiving voltage being brought into an uncontrollable state, or a possibility of the receiving voltage becoming an overvoltage, due to the light load, as described with reference to FIG. 8, for example. For example, it is conceivable to set the threshold current Ith to about 100 mA. Further, the value of the threshold current Ith is not limited to a fixed value, and may be, for example, a variable value as described below (a configuration in which a value is variable). Specifically, for example, as indicated by an arrow P2 in FIG. 13, the value of the threshold current Ith may be set to vary according to the magnitude of the receiving voltage (the DC receiving voltage Vdc) supplied from the power receiving section 20 and rectified (for example, to control a load resistance value in the electronic unit 2 to be equal to or less than a constant value).

Here, when it is determined that the detected DC receiving current Idc is equal to or more than the threshold current Ith (Idc≥Ith) (step S105: N), it may be said that there is no possibility of the receiving voltage being brought into an uncontrollable state, or no possibility of the receiving voltage becoming an overvoltage, due to the light load, as described with reference to FIG. 8, for example. Therefore, in this case, the electronic unit 2 notifies the feed unit 1 of the request for start of the main feeding by utilizing communication (step S106), without performing the current increasing control to be described below. In other words, in this case, as illustrated in FIG. 7 described above, in the dummy load circuit 23, the dummy loads Ra and Rb both remain set in the state of being not connected to the points in the supply path of the DC receiving current Idc (see a current range A2 illustrated in FIG. 13).

On the other hand, when it is determined that the detected DC receiving current Idc is less than the threshold current Ith (Idc<Ith) (step S105: Y), the current increasing control is performed in the electronic unit 2 as follows.

Figure 13:
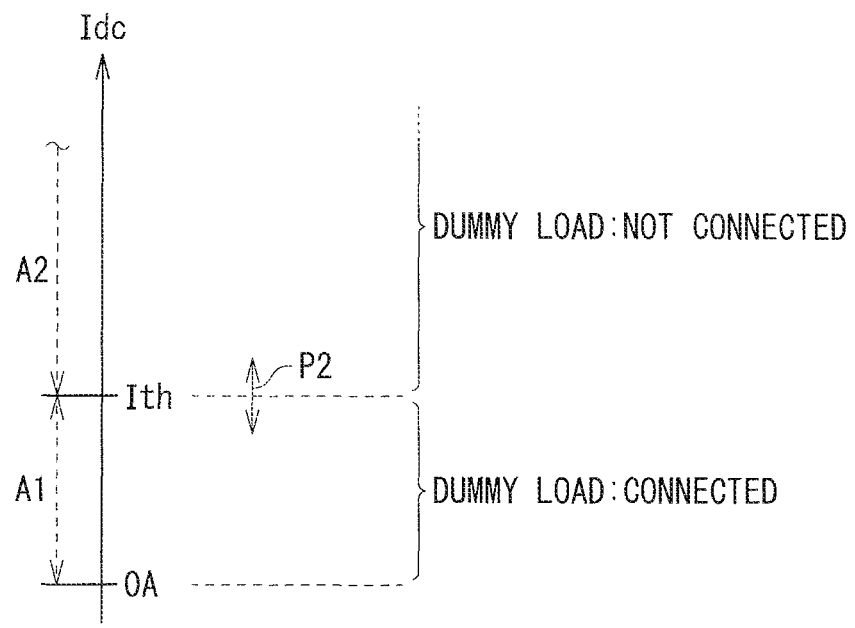
FIG. 13 is a diagram illustrating an example of a relationship between a receiving current and a connection state of a dummy load.
Figure 14:
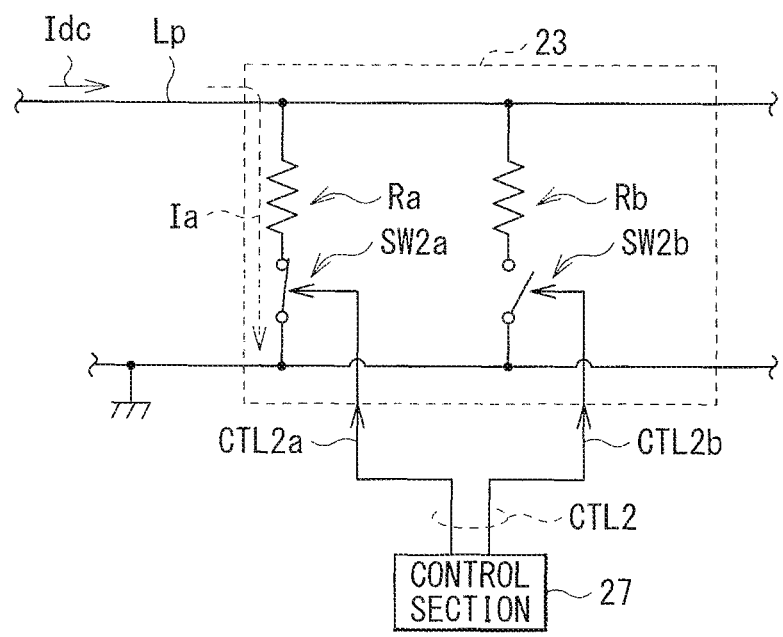
FIG. 14 is a circuit diagram schematically illustrating another state example of the dummy load circuit illustrated in FIG. 6.

First, for example, as illustrated in FIG. 14, the control section 27 connects one or both of the dummy load Ra and the Rb (in this example, only the dummy load Ra) in the dummy load circuit 23, to the point in the supply path of the DC receiving current Idc (step S107, see a current range A1 illustrated in FIG. 13). Specifically, the control section 27 controls the switching element SW2a to be in the ON state, and the switching element SW2b to be in the OFF state. As a result, as illustrated in FIG. 14, a current Ia flows to the dummy load Ra through the supply path (the power supply line Lp) of the DC receiving current Idc, and thus the DC receiving current Idc is increased. In this way, control of increasing the DC receiving current Idc (the current increasing control) is performed.

After such current increasing control is performed, the control section 27 determines whether the DC receiving current Idc detected again is less than the threshold current Ith (Idc<Ith) (step S108). Here, when it is determined that the DC receiving current Idc detected again is equal to or more than the threshold current Ith (Idc≥Ith) (step S105: N), namely, when the DC receiving current Idc is increased to the threshold current Ith or more by the current increasing control, the flow proceeds to step S106 described above. In other words, the electronic unit 2 notifies the feed unit 1 of the request for start of the main feeding, by utilizing communication. This is because, in this case as well, it may be said that there is no possibility of the receiving voltage being brought into an uncontrollable state, or no possibility of the receiving voltage becoming an overvoltage, due to the light load.

On the other hand, when it is determined that the DC receiving current Idc detected again is also less than the threshold current Ith (Idc<Ith) (step S108: Y), namely, when the DC receiving current Idc detected again is still less than the threshold current Ith even after the current increasing control is performed, the current increasing control is performed again in the following manner. In other words, the control section 27 additionally connects the dummy load to the point in the supply path of the DC receiving current Idc in the dummy load circuit 23, or switches the dummy load to the dummy load having a larger load (for example, a larger resistance value) (step S109). It is to be noted that after such second-time current increasing control, the flow returns to step S108.

Figure 15A:
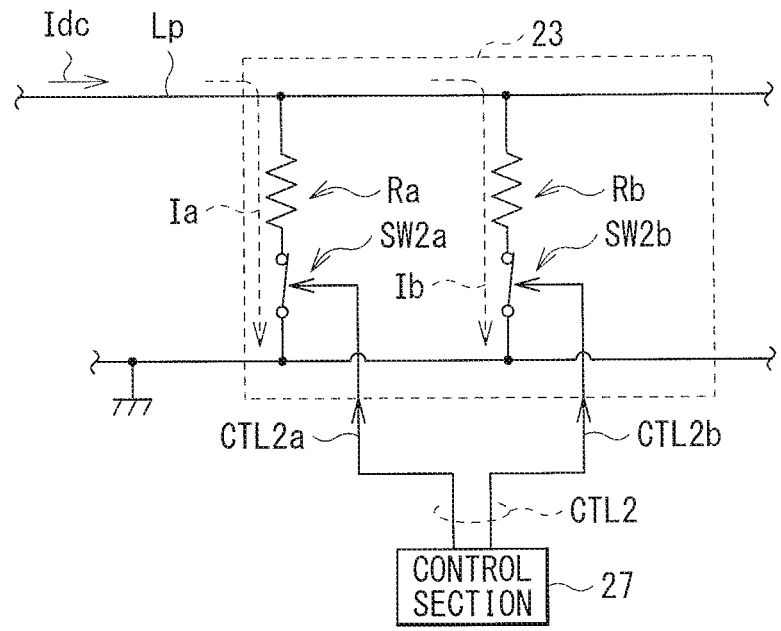
FIG. 15A is a circuit diagram schematically illustrating still another state example of the dummy load circuit illustrated in FIG. 6.

Here, the case of additionally connecting the dummy load may be, specifically, as illustrated in FIG. 15A, for example. In this example, the control section 27 connects the dummy load Rb, in addition to the dummy load Ra, to the point in the supply path of the DC receiving current Idc. To be more specific, the control section 27 controls the switching elements SW2a and SW2b to be both in the ON state. As a result, as illustrated in FIG. 15A, the current Ia and a current Ib flow to the dummy loads Ra and Rb, respectively, through the supply path of the DC receiving current Idc, thereby further increasing the DC receiving current Idc. In this way, the control of further increasing the DC receiving current Idc is performed.

Figure 15B:
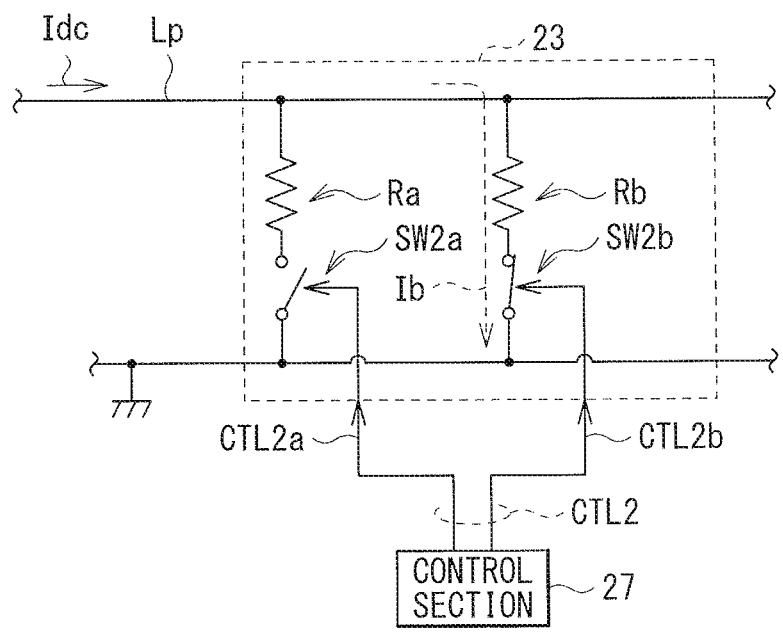
FIG. 15B is a circuit diagram schematically illustrating still another state example of the dummy load circuit illustrated in FIG. 6.

On the other hand, the case of switching the dummy load to a larger load may be, specifically, as illustrated in FIG. 15B, for example. In this example, when the load of the dummy load Rb is larger than that of the dummy load Ra, the control section 27 connects the dummy load Rb, instead of the dummy load Ra, to the point in the supply path of the DC receiving current Idc. To be more specific, the control section 27 controls the switching element SW2a to be in the OFF state and the switching element SW2b to be in the ON state. As a result, as illustrated in FIG. 15B, the current Ib flows the dummy load Rb having the larger load through the supply path of the DC receiving current Idc, thereby further increasing the DC receiving current Idc. In this way, the control of further increasing the DC receiving current Idc is performed.

Here, after the request for start of the main feeding is notified to the feed unit 1 side (step S106) as described above, the main feeding in which the electric power is higher than that in the preliminary feeding is then started to feed the electric power from the feed unit 1 to the electronic unit 2 (step S110). In other words, in this main feeding, the AC signal generating circuit 11 in the feed unit 1 is switched from the half-bridge circuit to the full-bridge circuit.

When the main feeding is thus started, the control section 27 switches the charging section 24 to an operating state, thereby setting the battery 25 serving as the main load to be connected to the power supply line Lp in the electronic unit 2 (step S111). Further, in this step S111, when setting the battery 25 to be in the state of being connected, the control section 27 disconnects both of the dummy loads Ra and Rb from the points in the supply path of the DC receiving current Idc. Specifically, as illustrated in FIG. 7 described above, the control section 27 controls the switching elements SW2a and SW2b to be both in the OFF state. As a result, the currents Ia and Ib do not flow to the dummy loads Ra and Rb, respectively, and the control of increasing the DC receiving current Idc is stopped.

Next, in the electronic unit 2, the charging section 24 performs the charging operation in which the battery 25 is charged based on the receiving power (the main feeding) (step S112 in FIG. 11). The control section 27 then determines whether the battery 25 is fully charged by the charging operation (step S113). Here, when it is determined that the battery 25 is fully charged (step S113: Y), the feeding and charging operation illustrated in FIG. 10 and FIG. 11 ends.

On the other hand, when it is determined that the battery 25 is not fully charged (step S113: N), the control section 27 then determines whether the DC receiving current Idc detected again at the charging operation is less than the threshold current Ith (Idc<Ith) (step S114). Here, when it is determined that the DC receiving current Idc detected again is equal to or more than the threshold current Ith (Idc≥Ith) (step S114: N), the above-described current increasing control is not performed, and the flow returns to step S112.

On the other hand, when it is determined that the DC receiving current Idc detected again is less than the threshold current Ith (Idc<Ith) (step S114: Y), the control section 27 performs the current increasing control by the above-described technique (the technique of connecting the dummy load) (step S115). After performing such current increasing control, the control section 27 then determines again whether the DC receiving current Idc is less than the threshold current Ith (Idc<Ith) (step S116).

Here, when it is determined that the DC receiving current Idc is equal to or more than the threshold current Ith (Idc Ith) (step S116: N), namely, when the DC receiving current Idc is increased to the threshold current Ith or more by the current increasing control, the flow returns to step S112 described above.

On the other hand, when it is determined that the DC receiving current Idc is less than the threshold current Ith (Idc<Ith) (step S116: Y), namely, when the DC receiving current Idc is still less than the threshold current Ith even after the current increasing control is performed, the control section 27 performs the current increasing control again by the above-described technique (the technique illustrated in either FIG. 15A or FIG. 15B, for example). Specifically, the control section 27 additionally connects the dummy load to the point in the supply path of the DC receiving current Idc in the dummy load circuit 23, or switches the dummy load to the dummy load having a larger load (step S117). It is to be noted that after such second-time current increasing control, the flow returns to step S116.

As described above, in the present embodiment, when the DC receiving current Idc at the time of the light load is less than the predetermined threshold current Ith, the current increasing control is performed to increase the DC receiving current Idc to the threshold current Ith or more. This makes it possible to control the receiving voltage (such as the DC receiving voltage Vdc) in the electronic unit 2 readily in an appropriate manner, even at the time of the light load. Specifically, it is possible to avoid the possibility of the receiving voltage being brought into an uncontrollable state, or the possibility of the receiving voltage becoming an overvoltage, due to the light load, as described with reference to FIG. 8, for example. Therefore, it is possible to perform appropriate control when the feeding is performed by using a magnetic field.

[Modifications]

Next, modifications (Modifications 1 to 4) of the above-described embodiment will be described. It is to be noted that the same elements as those in the embodiment will be provided with the same reference numerals as those thereof, and the description thereof will be omitted appropriately.

[Modification 1]

Figure 16:
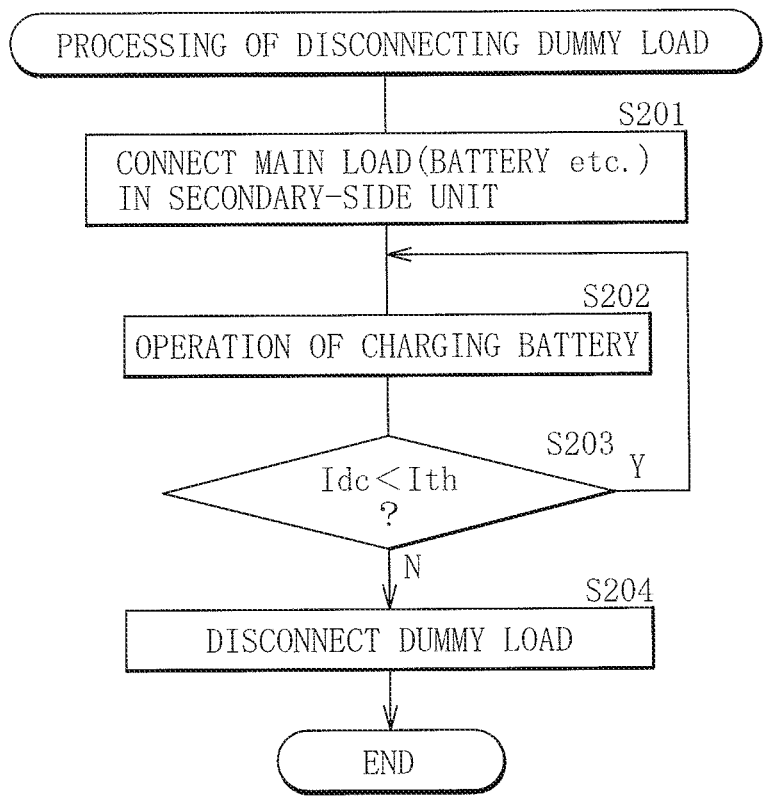
FIG. 16 is a flowchart illustrating an example of processing of disconnecting a dummy load according to Modification 1.

FIG. 16 is a flowchart illustrating an example of processing of disconnecting the dummy load according to Modification 1. Unlike the above-described embodiment, in the present modification, the control section 27 disconnects the dummy load from the point in the supply path of the DC receiving current Idc when the DC receiving current Idc is equal to or more than the threshold current Ith (Idc≥Ith) after the battery 25 is set to be in a connection state. In other words, the control section 27 disconnects the dummy load, upon confirming the magnitude of the DC receiving current Idc again after the battery 25 is set to be in the connection state.

It is to be noted that the processing illustrated in FIG. 16 may be, for example, processing replacing the processing in steps S111 and S112 in the above-described embodiment. Otherwise, a series of steps in feeding and charging operation in the present modification is basically similar to that in the above-described embodiment.

In the processing of disconnecting the dummy load of the present modification, at first, in a manner similar to that of the embodiment, when the battery 25 serving as the main load is connected in the electronic unit 2 (step S201 in FIG. 16), the operation of charging the battery 25 is performed (step S202). However, in the present modification, the dummy load is not yet disconnected at this stage, unlike the above-described embodiment.

Subsequently, in the electronic unit 2, it is determined again whether the DC receiving current Idc detected at this stage is less than the threshold current Ith (Idc<Ith) (step S203). Here, when it is determined that the detected DC receiving current Idc is less than the threshold current Ith (Idc<Ith) (step S203: Y), the load is still a light load. Therefore, the dummy load is not yet disconnected at this stage, and the flow returns to step S202.

On the other hand, when it is determined that the detected DC receiving current Idc is equal to or more than the threshold current Ith (Idc Ith) (step S203: N), the control section 27 then performs control to disconnect the dummy load (step S204). This ends the processing of disconnecting the dummy load illustrated in FIG. 16.

In this way, in the present modification, the dummy load is disconnected upon the confirmation of the magnitude of the DC receiving current Idc again, after the battery 25 is set to be in the connection state. Therefore, in addition to the effects in the above-described embodiment, it is possible to obtain the following effect, for example. First, when the battery 25 serving as the main load is set to be in the connection state, the main load is a heavy load and therefore, like the above-described embodiment, the dummy load may be desirably disconnected at this moment. However, depending on the situation, the load may be in a light-load state even after the main load is connected. Therefore, the timing of disconnecting the dummy load may be controlled appropriately according to the situation, by adopting the above-described technique of the present modification. Hence, it is possible to perform the control more appropriately when the feeding is performed by using a magnetic field.

[Modification 2]

Figure 17:
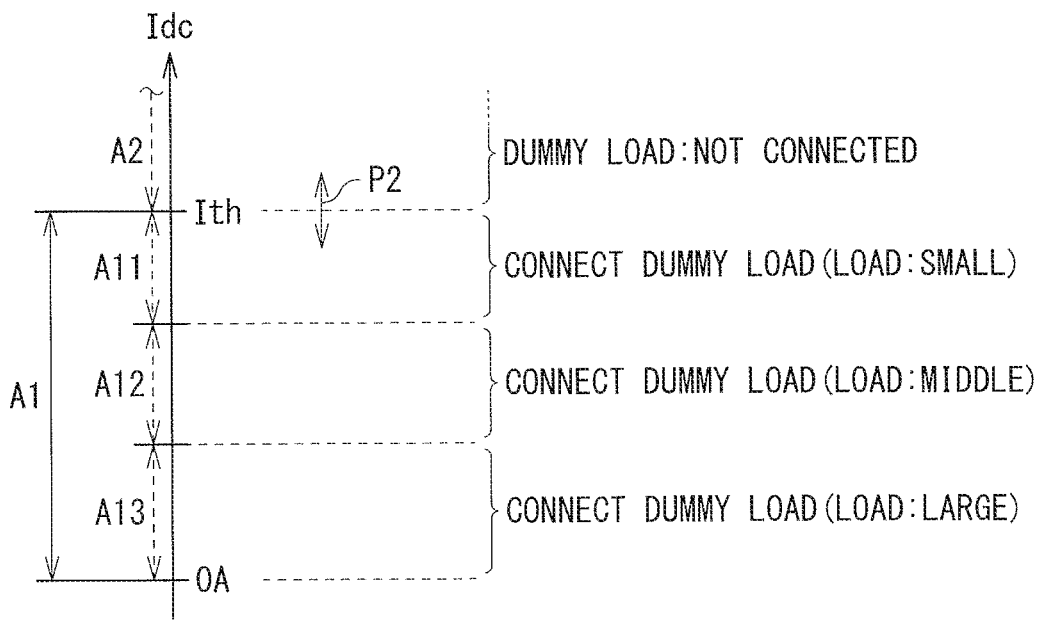
FIG. 17 is a diagram illustrating an example of a relationship between a receiving current and a connection state of a dummy load according to Modification 2.

FIG. 17 illustrates an example of a relationship between the receiving current (the DC receiving current Idc) and the connection state of the dummy load according to Modification 2. In the present modification, the dummy load circuit 23 includes a plurality of types (three types, in this example) of dummy loads different in magnitude of load (the resistance value or the like) from one another. When it is determined that the DC receiving current Idc is less than the threshold current Ith, the control section 27 performs the current increasing control by connecting the dummy load of the type that is selected from the plurality of types of dummy loads according to the magnitude of the DC receiving current Idc, to the point in the supply path of the DC receiving current Idc.

Specifically, the control section 27 connects the dummy load having a relatively large load, as the DC receiving current Idc becomes small. In other words, in the example illustrated in FIG. 17, the control section 27 connects the dummy load by switching the type of the dummy load in the order of a small load, a middle load, and a large load, as the value of the DC receiving current Idc less than the threshold current Ith becomes small (according to shifting in the order of a current range A11, a current range A12, and a current range A13).

In this way, in the present modification, the dummy load of the type selected from the plurality of types of dummy loads different in magnitude of load from one another is connected, according to the magnitude of the detected DC receiving current Idc. Therefore, it is possible to perform more-precise current increasing control.

It is to be noted that, in the example illustrated in FIG. 17, the three types of dummy loads different in magnitude of load from one another are used, but the types are not limited to three. Two types, or four or more types of dummy loads different in magnitude of load from one another may be used.

[Modification 3]

(Configuration)

Figure 18:
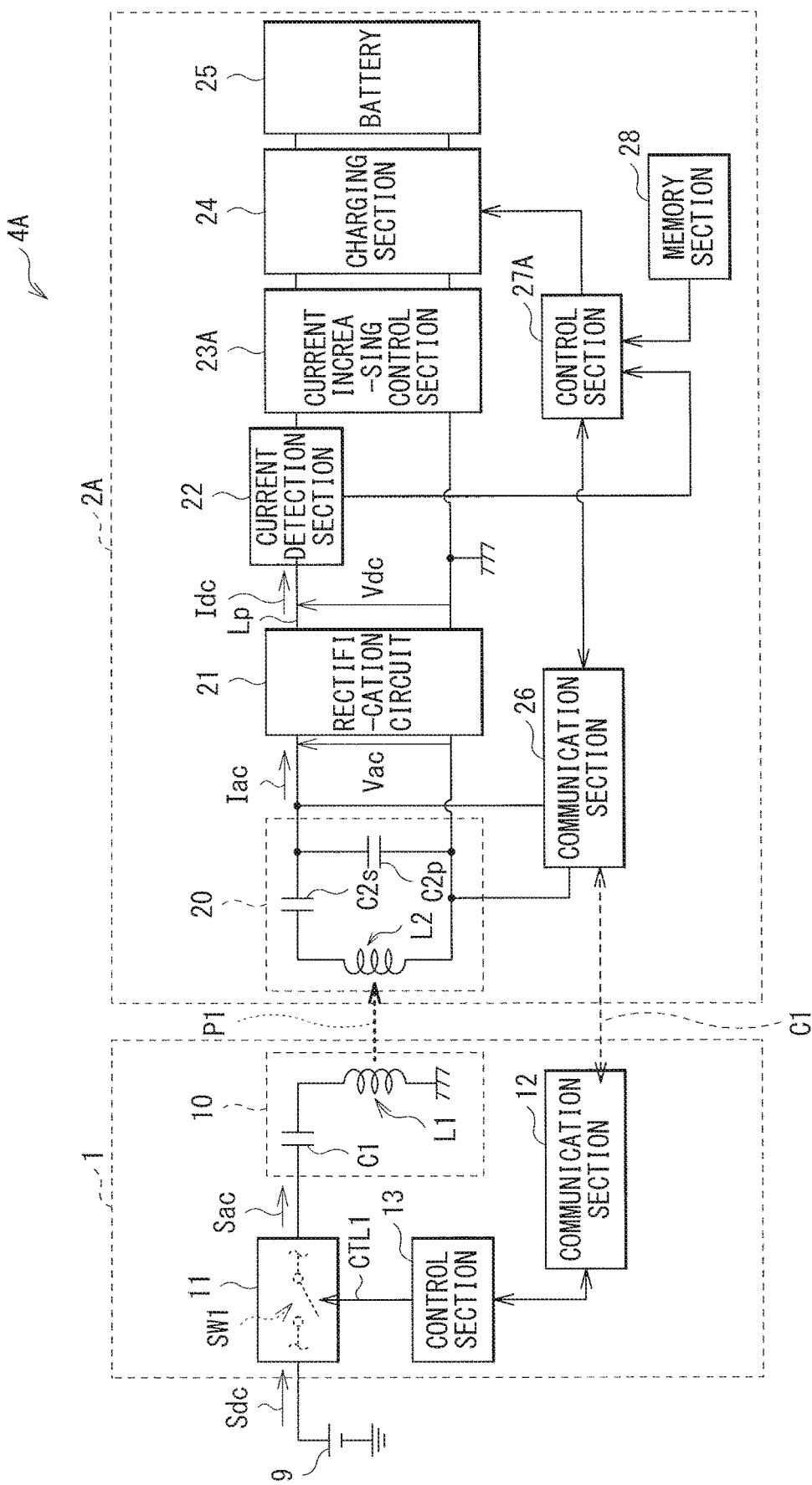
FIG. 18 is a diagram illustrating a configuration example of a feed system according to Modification 3.

FIG. 18 illustrates a configuration example of a feed system (a feed system 4A) according to Modification 3, by using a block diagram and a circuit diagram. The feed system 4A of the present modification includes the feed unit 1 and an electronic unit 2A. In other words, the feed system 4A corresponds to the feed system 4 including the electronic unit 2A in place of the electronic unit 2, and is similar thereto in terms of other configurations.

As illustrated in FIG. 18, the electronic unit 2A corresponds to the electronic unit 2 including a current increasing control section 23A in place of the dummy load circuit 23, and a control section 27A in place of the control section 27. The electronic unit 2A is similar to the electronic unit 2 in terms of other configurations. The control section 27A corresponds to the control section 27 configured not to perform the above-described current increasing control, and is similar thereto in terms of other configurations. Further, the current increasing control section 23A performs current increasing control to be described below in place of the control section 27, and corresponds to a specific but not limitative example of "control section" in the present disclosure.

Figure 19:
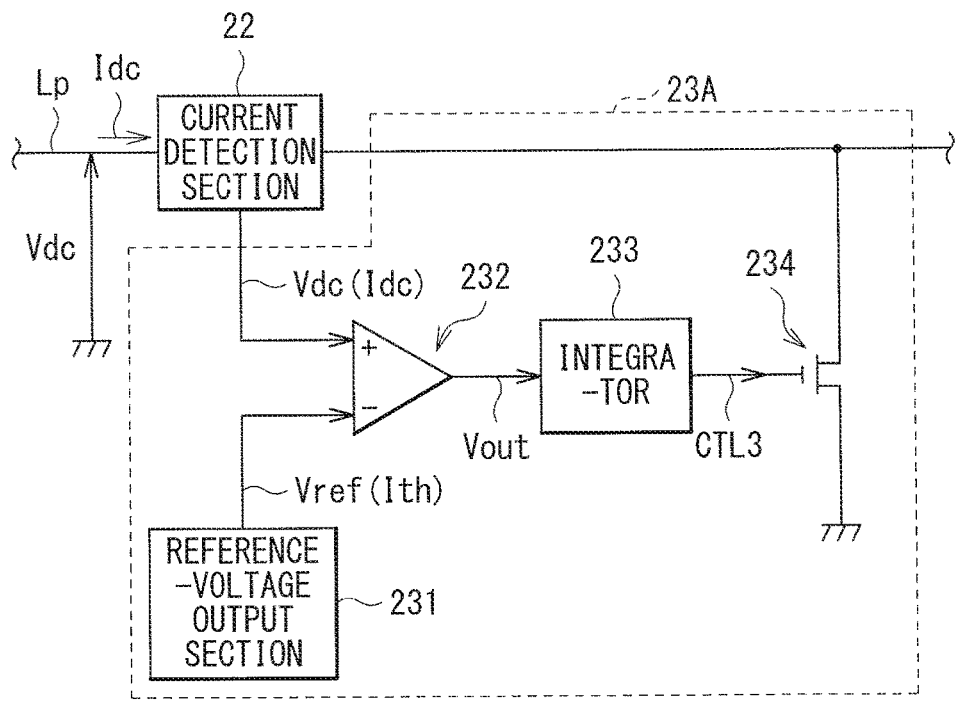
FIG. 19 is a block diagram illustrating a configuration example of a current increasing control section illustrated in FIG. 18.
Figure 20:
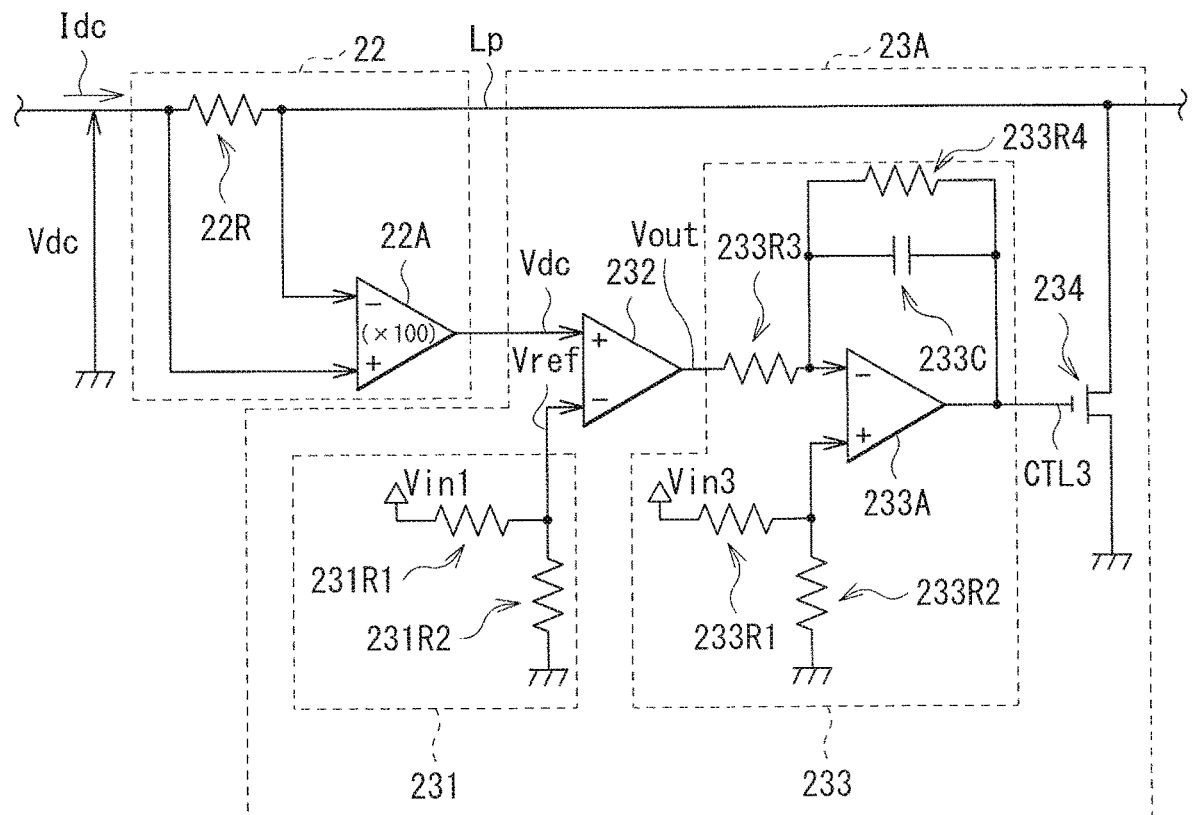
FIG. 20 is a circuit diagram illustrating a configuration example of the current increasing control section illustrated in FIG. 19.

FIG. 19 illustrates a configuration example of the current increasing control section 23A, by using a block diagram. FIG. 20 illustrates a configuration example of the current increasing control section 23A illustrated in FIG. 19, by using a circuit diagram. Further, FIGS. 21A and 21B each illustrate a detailed configuration example of the current increasing control section 23A illustrated in FIG. 20, by using a circuit diagram, together with a circuit configuration example of the current detection section 22.

As will be described later, the current increasing control section 23A is a circuit (an automatic load control section) that actively performs the current increasing control, to increase the DC receiving current Idc to the threshold current Ith or more (Idc Ith). In other words, the current increasing control is performed to prevent the DC receiving current Idc from becoming less than the threshold current Ith (Idc<Ith). As illustrated in FIG. 19, the current increasing control section 23A includes a reference-voltage output section 231, a comparator 232, an integrator 233, and a transistor 234.

Here, before description of these configurations in the current increasing control section 23A, a circuit configuration example of the current detection section 22 in the present modification will be described with reference to FIGS. 20, 21A, and 21B. In the present modification, the current detection section 22 detects the current (the DC receiving current Idc) as the voltage (the DC receiving voltage Vdc), and may include, for example, a resistor 22R and an amplifier 22A. The resistor 22R is provided to be inserted in the supply path (the power supply line Lp) of the DC receiving current Idc. Wiring connected to one end side of the resistor 22R is connected to a positive-side (+) input terminal of the amplifier 22A, and wiring connected to the other end side of the resistor 22R is connected to a negative-side (−) input terminal of the amplifier 22A. Further, from an output terminal of the amplifier 22A, the detected DC receiving current Idc is outputted as the DC receiving voltage Vdc.

As illustrated in FIG. 20, for example, the reference-voltage output section 231 may be a circuit that outputs a reference voltage Vref corresponding to the threshold current Ith, and may include two resistors 231R1 and 231R2. An input voltage Vin1 to be described later is inputted to one end of the resistor 231R1, and the other end of the resistor 231 R1 is connected to one end of the resistor 231R2 and a negative-side input terminal of the comparator 232 to be described later. The other end of the resistor 231R2 is grounded. With such a configuration, in the reference-voltage output section 231, the input voltage Vin1 is divided according to a resistance ratio between the resistors 231R1 and 231R2, and outputted as the reference voltage Vref. Specifically, when the resistors 231R1 and 231R2 are assumed to have respective resistance values R11 and R12, the reference voltage Vref is expressed by the following expression (1).

$$Vref = Vin1 \times \{R12/R11 + R12)\} \quad (1)$$

Figure 21A:
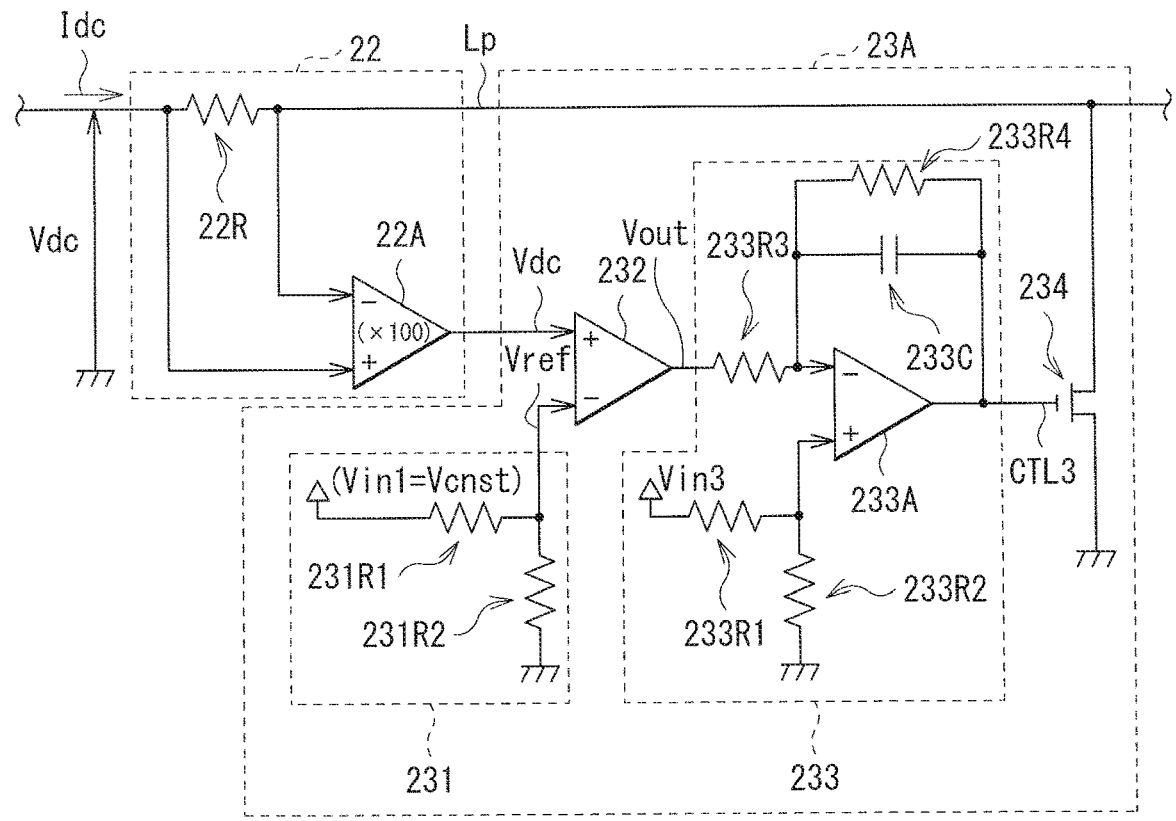
FIG. 21A is a circuit diagram illustrating a detailed configuration example of the current increasing control section illustrated in FIG. 20.

Here, there may be a case in which a predetermined fixed voltage Vcnst is used as the input voltage Vin1 (Vin1=Vcnst) as illustrated in FIG. 21A, for example. There may also be a case in which the DC receiving voltage Vdc that is a variable voltage is used as the input voltage Vin1 (Vin1=Vdc) as illustrated in FIG. 21B, for example.

In the example of FIG. 21A, in the reference-voltage output section 231, the reference voltage Vref that is a constant voltage is generated by dividing the fixed voltage Vcnst according to the above-described resistance ratio. On the other hand, in the example of FIG. 21B, in the reference-voltage output section 231, the reference voltage Vref that is a variable voltage is generated by dividing the DC receiving voltage Vdc according to the above-described resistance ratio. This variable voltage varies in connection with a change in the DC receiving voltage Vdc.

As illustrated in FIG. 19, the comparator 232 is a circuit that compares the magnitude (electric potential) of the DC receiving voltage Vdc corresponding to the DC receiving current Idc, with that of the reference voltage Vref corresponding to the threshold current Ith, and the comparator 232 then outputs an output signal (an output voltage Vout) indicating a result of the comparison. In the comparator 232, as illustrated in FIGS. 19 to 21B, the DC receiving voltage Vdc is inputted to a positive-side input terminal thereof, the reference voltage Vref is inputted to a negative-side input terminal thereof, and the output voltage Vout is outputted from an output terminal thereof.

The integrator 233 is a circuit (an active LPF (Low Pass Filter), or a PI (Proportional Integral) control circuit) that performs the current increasing control to be described later. The integrator 233 performs the current increasing control by generating the control signal CTL3 of the transistor 234, based on the output voltage Vout supplied from the comparator 232, and outputting the generated control signal CTL3. Specifically, the integrator 233 generates the control signal CTL3 by multiplying the output voltage Vout sent from the comparator 232.

Figure 21B:
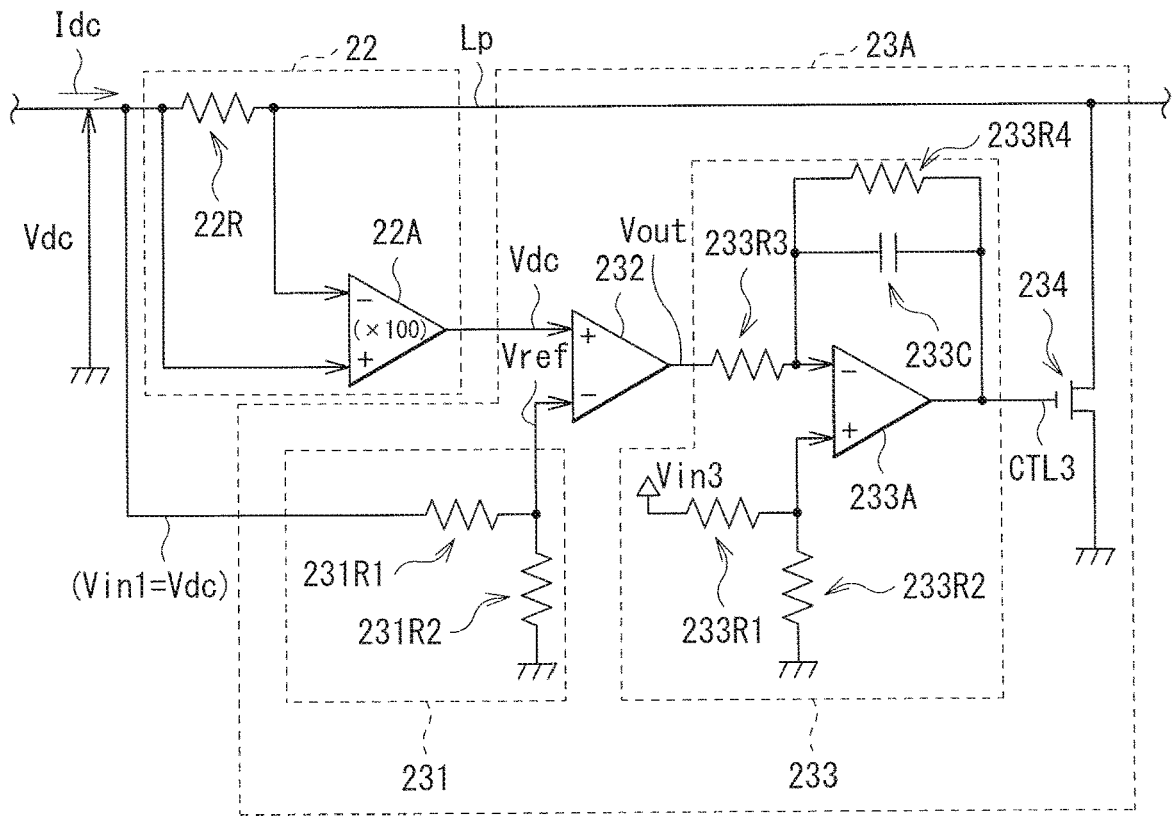
FIG. 21B is a circuit diagram illustrating another detailed configuration example of the current increasing control section illustrated in FIG. 20.

The integrator 233 may include, for example, four resistors 233R1, 233R2, 233R3, and 233R4, a capacitor 233C, and an amplifier 233A, as illustrated in FIGS. 20, 21A, and 21B. An input voltage Vin3 is inputted to one end of the resistor 233R1, and the other end of the resistor 233R1 is connected to one end of the resistor 233R2 and a positive-side input terminal of the amplifier 233A. The other end of the resistor 233R2 is grounded. Further, one end of the resistor 233R3 is connected to an output terminal of the comparator 232, and the other end of the resistor 233R3 is connected to a negative-side input terminal of the amplifier 233A and one end of each of the capacitor 233C and the resistor 233R4. The other end of each of the capacitor 233C and the resistor 233R4 is connected to an output terminal of the amplifier 233A and a gate of the transistor 234 to be described later.

The transistor 234 operates according to control by the control signal CTL3 supplied from the integrator 233, and is configured of a MOS transistor in this example. However, for example, the transistor 234 may be a bipolar transistor, or the like. As illustrated in FIGS. 19 to 21B, the control signal CTL3 is inputted to the gate of the transistor 234, one of a source and a drain thereof is connected to the supply path (the power supply line Lp) of the DC receiving current Idc, and the other is grounded. As will be described later in detail, in the transistor 234, such a configuration makes it possible to flow a current between the power supply line Lp and the ground according to the control of a gate voltage by the control signal CTL3.

(Functions and Effects)

In the feed system 4A of the present modification, the following operation (the current increasing control) is performed in the current increasing control section 23A.

First, based on the output signal (the output voltage Vout) from the comparator 232, the integrator 233 in the current increasing control section 23A determines whether the DC receiving voltage Vdc at the time of the light load described above is less than the reference voltage Vref (whether Vdc<Vref is satisfied). In other words, the integrator 233 determines whether the DC receiving current Idc at the time of the light load is less than the threshold current Ith (whether Idc<Ith is satisfied).

Figure 22A:
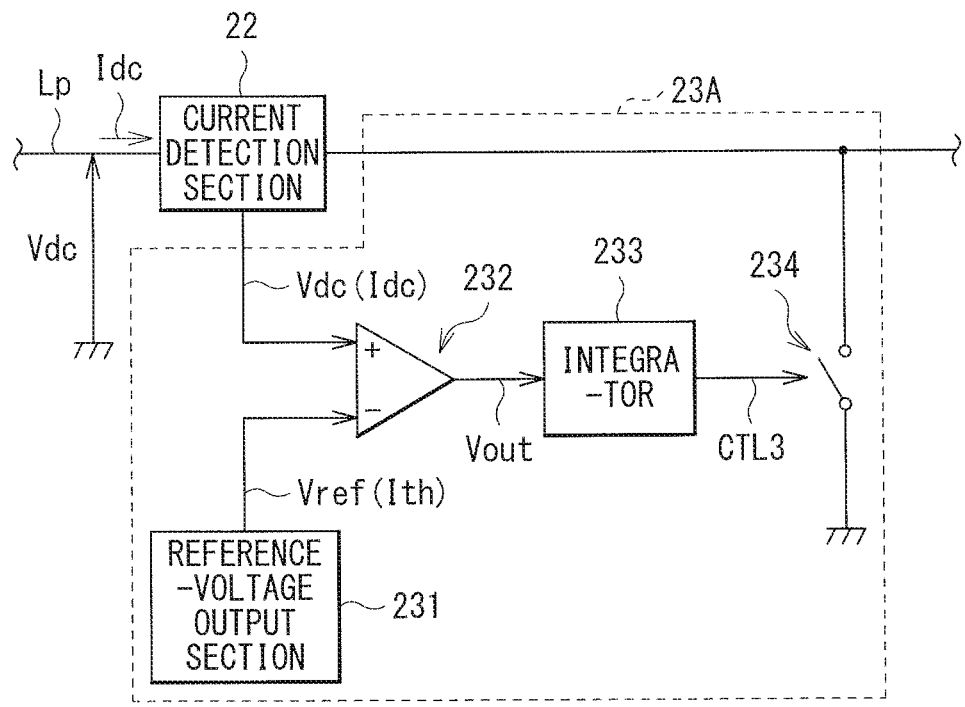
FIG. 22A is a block diagram illustrating a state example of the current increasing control section illustrated in FIG. 19.

Here, when it is determined that Vdc≥Vref (Idc≥Ith) is satisfied, it may be said that there is no possibility of the receiving voltage being brought into an uncontrollable state, or no possibility of the receiving voltage becoming an overvoltage, due to the light load, as described above. Therefore, in this case, the current increasing control to be described below is not performed in the current increasing control section 23A. In other words, in this case, the transistor 234 is set in an OFF state according to a control signal CT3 outputted from the integrator 233, and a current does not flow to the transistor 234, as illustrated in FIG. 22A, for example.

Figure 22B:
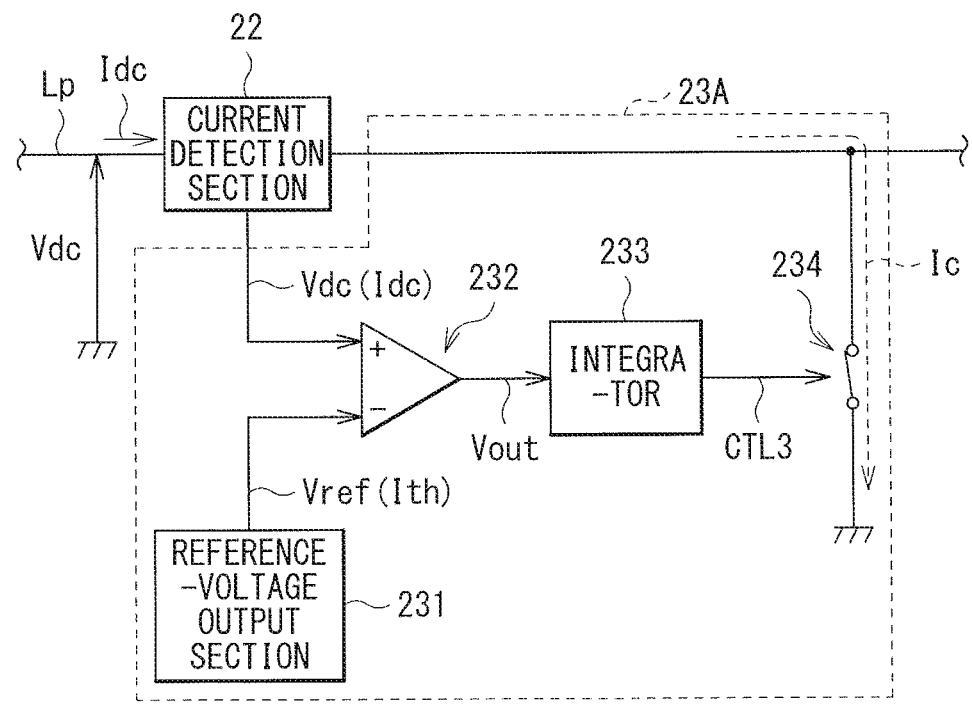
FIG. 22B is a block diagram illustrating another state example of the current increasing control section illustrated in FIG. 19.

On the other hand, when it is determined that Vdc<Vref (Idc<Ith) is satisfied, it may be said that there is a possibility of the receiving voltage being brought into an uncontrollable state, or a possibility of the receiving voltage becoming an overvoltage, due to the light load, as described above. Therefore, in this case, the current increasing control to be described below is performed in the current increasing control section 23A. Specifically, in such a case, the integrator 233 sets the transistor 234 in an ON state based on the control signal CT3, and connects the transistor 234 to the supply path (the power supply line Lp) of the DC receiving current Idc, as illustrated in FIG. 22B, for example. As a result, as illustrated in FIG. 22B, a current Ic flows to the transistor 234, thereby increasing the DC receiving current Idc. In this way, the current increasing control is performed to increase the DC receiving current Idc to the threshold current Ith or more (Idc≥Ith).

Figure 23:
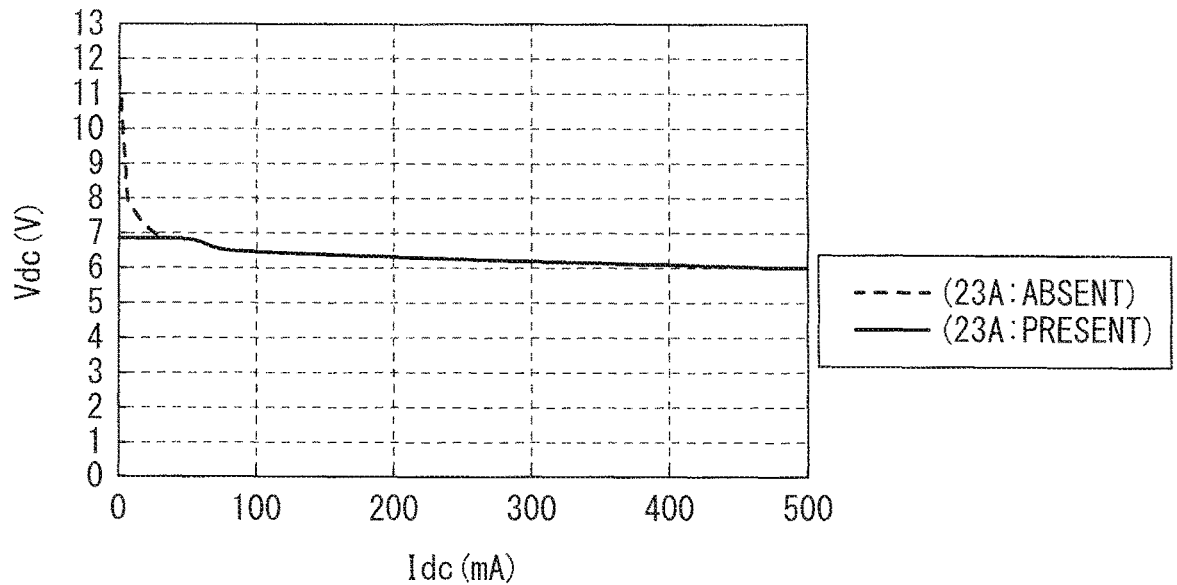
FIG. 23 is a characteristic diagram illustrating an example of a measurement result according to Modification 3.
Figure 24:
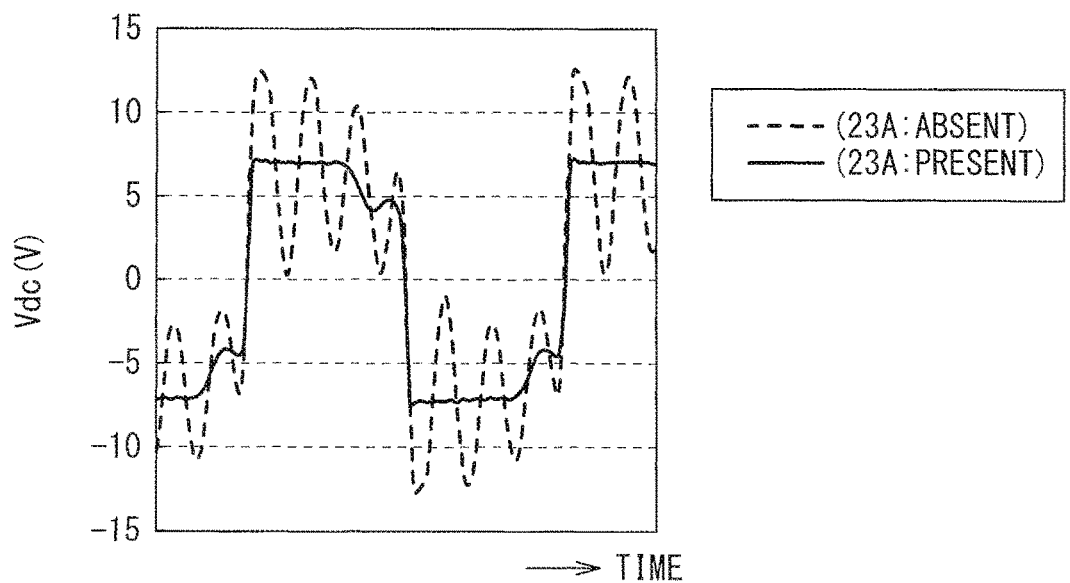
FIG. 24 is a characteristic diagram illustrating another example of the measurement result according to Modification 3.

Here, FIG. 23 and FIG. 24 each illustrate a measurement result example according to Modification 3, both in a case (Example) in which the current increasing control section 23 is provided, and in a case (a comparative example) in which the current increasing control section 23 is not provided. Specifically, FIG. 23 illustrates the measurement result example indicating a relationship between the DC receiving current Idc and the DC receiving voltage Vdc, and FIG. 24 illustrates the measurement result example indicating temporal variations of the AC receiving voltage Vac. It is to be noted that in each of these measurement result examples, a result similar to a simulation was obtained.

It is apparent from FIG. 23 that an abrupt rise in the DC receiving voltage Vdc when the DC receiving current Idc is small is avoided by providing the current increasing control section 23A. Further, it is apparent from FIG. 24 that ringing in the AC receiving voltage Vac due to a harmonic is suppressed by providing the current increasing control section 23A, so that a rise in voltage is suppressed.

Figures 25, 26:
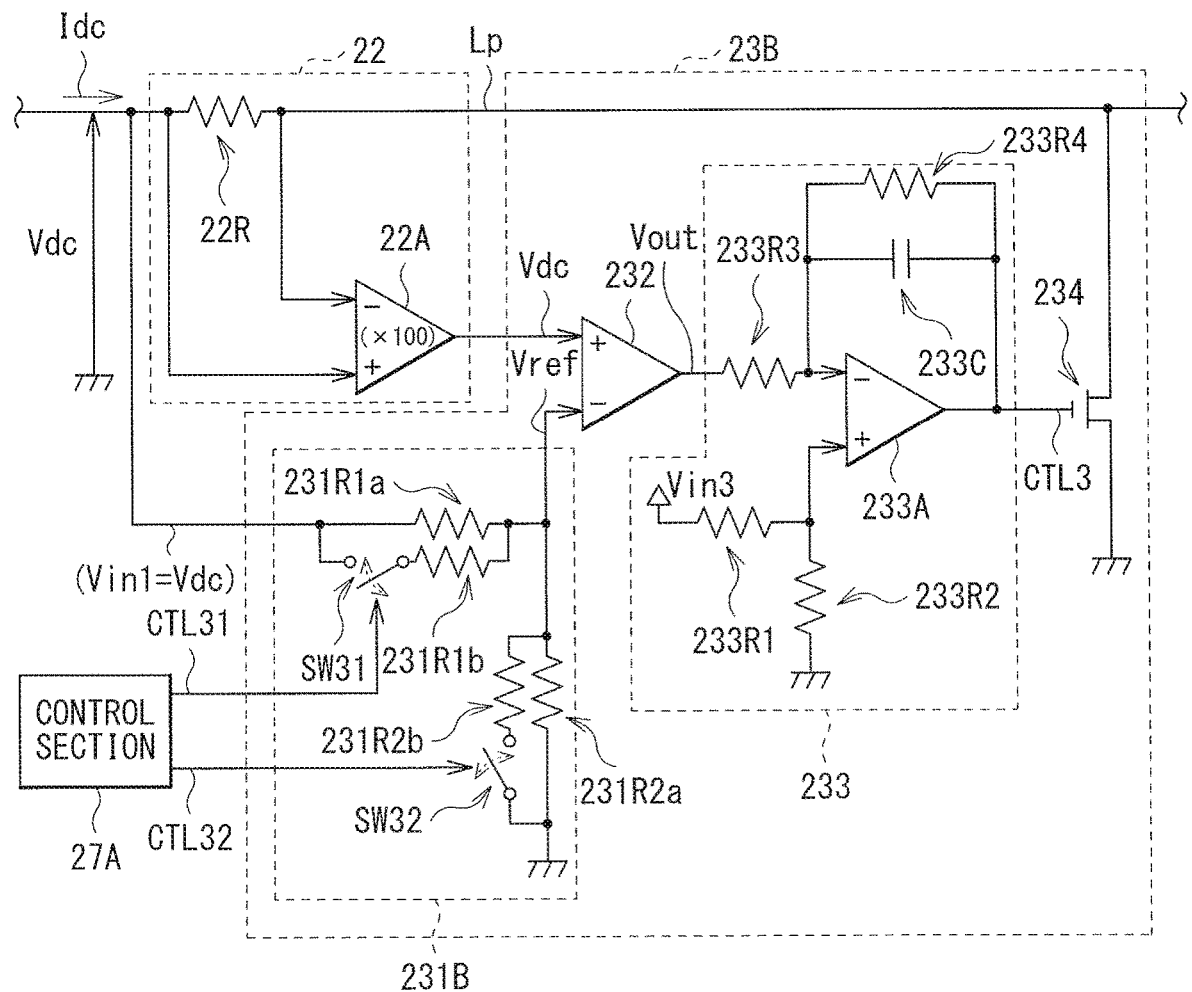
FIG. 25 is a diagram illustrating an example of a relationship between a reference voltage and each parameter according to Modification 3.
FIG. 26 is a circuit diagram illustrating a configuration example of a current increasing control section according to Modification 4.

Further, FIG. 25 illustrates a measurement result example indicating a relationship between the reference voltage Vref and each parameter (the DC receiving voltage Vdc, the threshold current Ith, and the load resistance value). FIG. 25 illustrates the example in the case of the circuit configuration (the configuration in which the DC receiving voltage Vdc that is a variable voltage is used as the input voltage Vin1) illustrated in FIG. 21B. It is apparent from FIG. 25 that, in the case of the circuit configuration, even when the DC receiving voltage Vdc changes, the reference voltage Vref (the threshold current Ith) also changes accordingly as described above. Therefore, as a result, the value of the load resistance is kept constant. Specifically, in this case, as the DC receiving voltage Vdc rises, the reference voltage Vref (the threshold current Ith) increases. Therefore, the current (the DC receiving current Idc) flows more, so that the load resistance value remains constant.

As described above, in the present modification, when the DC receiving current Idc at the time of the light load is less than the threshold current Ith, the current increasing control section 23A performs the current increasing control, to increase the DC receiving current Idc to the threshold current Ith or more. This makes it possible to control the receiving voltage (such as the DC receiving voltage Vdc) in the electronic unit 2A readily in an appropriate manner, even at the time of the light load. Specifically, it is possible to avoid a possibility of the receiving voltage being brought into an uncontrollable state, or a possibility of the receiving voltage becoming an overvoltage, due to the light load, as described with reference to FIG. 8, for example. Therefore, like the above-described embodiment, it is possible to perform appropriate control in the feeding using a magnetic field.

Further, in the present modification, in particular, it is possible to perform autonomous (active) current increasing control, and it is also possible to perform continuous, not stepping (discontinuous), current increasing control, unlike the case of the current increasing control utilizing the dummy load circuit 23 described in the above-described embodiment.

Furthermore, when the reference voltage Vref, which is a variable voltage that varies in connection with a change in the DC receiving voltage Vdc, is generated by dividing the DC receiving voltage Vdc, as illustrated in FIG. 21B, for example, it is possible to obtain the following effect. For example, in a case such as when a voltage fluctuation of the DC receiving current Idc is large, maintaining the load resistance value constant using such a circuit configuration may produce an effect larger than that of the case of maintaining the DC receiving current Idc constant.

[Modification 4]

(Configuration)

FIG. 26 illustrates a circuit configuration example of a current increasing control section (a current increasing control section 23B) according to Modification 4. The current increasing control section 23B of the present modification corresponds to a current increasing control section in which a reference-voltage output section 231B is provided in place of the reference-voltage output section 231 in the current increasing control section 23 (the configuration of FIG. 21B) described in Modification 3, and operation of the reference-voltage output section 231B is controlled by the control section 27A. The present modification is similar to Modification 3 in terms of other configurations.

The reference-voltage output section 231B is capable of changing a voltage division ratio in dividing the DC receiving voltage Vdc in the reference-voltage output section 231 illustrated in FIG. 21B. Specifically, in the reference-voltage output section 231B, two resistors 231R1a and 231R1b connected in parallel to each other are provided in place of the resistor 231R1 illustrated in FIG. 21B, and a switching element SW31 that is configured of a MOS transistor or the like is connected in series to the resistor 231R1b. Similarly, two resistors 231R2a and 231R2b connected in parallel to each other are provided in place of the resistor 231R2 illustrated in FIG. 21B, and a switching element SW32 that is configured of a MOS transistor or the like is connected in series to the resistor 231R2b. The switching elements SW31 and SW32 are individually controlled to be in an ON state and an OFF state, according to control signals CTL31 and CTL32, respectively, supplied from the control section 27A (see an arrow of a broken line in FIG. 26).

In the reference-voltage output section 231B, the ON/OFF state of each of the switching elements SW31 and SW32 is thus individually controlled so that the voltage division ratio (the resistance ratio) in dividing the DC receiving voltage Vdc changes as described above. Therefore, in the current increasing control section 23B of the present modification, it is possible to change the value of the reference voltage Vref according to the control by the control section 27A, and it is also possible to obtain, for example, the following effect, in addition to the effects in Modification 3.

In the current increasing control section 23A described in Modification 3, dynamic control by the control section 27A is basically unnecessary so that standalone operation is possible, which is a great advantage. Meanwhile, when non-contact feeding is performed, there are a plurality of phases such as an initial operation phase, a communication phase, and a feeding phase, in many cases. In addition, it is conceivable to change a topology according to electric power and therefore, it is also conceivable to change a current value and a load resistance value to be controlled, for each one of the plurality of phases. Therefore, the current increasing control section 23B of the present modification is used to make it possible to change a control value (such as the current value and the load resistance value) in a specific phase, by actively performing load control with an initial parameter, without performing the dynamic control by the control section 27A that is unnecessary.

Moreover, like the case in which the current value is controlled, it is possible to avoid a possibility of the DC receiving voltage Vdc becoming an overvoltage, etc., by controlling the load resistance value to be less than a certain value.

It is to be noted that, the present modification is configured such that the voltage division ratio is changed utilizing the ON/OFF state of each of the switching elements SW31 and SW32, but is not limited thereto. For example, the voltage division ratio may be changed using a variable resistor as each of the resistors 231R1 and 231R2 illustrated in FIG. 21B.

[Other Modifications]

The technology of the present disclosure has been described with reference to the embodiment and the modifications. However, the present technology is not limited to these embodiments and the like, and may be variously modified.

For example, the description has been provided using various coils (the power transmission coil, and the power receiving coil) in the above-described embodiment and the like, but various kinds of configurations may be used as the configurations (the shapes) of these coils. In other words, each coil may have, for example, a shape such as a spiral shape, a loop shape, a bar shape using a magnetic substance, an a-winding shape in which a spiral coil is folded to be in two layers, a spiral shape having more multiple layers, a helical shape in which a winding is wound in a thickness direction, etc. In addition, each coil may be not only a winding coil configured using a wire rod having conductivity, but also a pattern coil having conductivity and configured using, for example, a printed circuit board, a flexible printed circuit board, etc.

Further, in the above-described embodiment and the like, an electronic unit has been described as an example of the unit to be fed, but the unit to be fed is not limited thereto and may be any type of unit to be fed other than electronic units (e.g. a vehicle such as an electric car).

Furthermore, in the above-described embodiment and the like, each component of the feed unit and the electronic unit has been specifically described. However, it is not necessary to provide all the components, or other component may be further provided. For example, a communication function, a function of performing some kind of control, a display function, a function of authenticating a secondary-side unit, a function of detecting a mixture such as dissimilar metal, and/or the like may be provided in the feed unit and/or the electronic unit. In addition, the configurations of the current increasing section (the dummy load circuit) and the current increasing control section, as well as the techniques of increasing the current, may also be other configurations and techniques, without being limited to those of the above-described embodiment and the like. Specifically, for example, the number of the dummy loads in the dummy load circuit may be one, or three or more, without being limited to the number (two) described in the above-described embodiment and the like. Further, for example, instead of the PI control, PID (Proportional Integral Derivative) control may be performed in the current increasing control section. Furthermore, in the above-described embodiment and the like, "the time of the light load" at which the current increasing control is to be performed has been described by taking, as an example, both of the period of the preliminary feeding (the first period) and the period of the charging operation (the second period) for the secondary battery based on the main feeding, but is not limited thereto. For example, only one of the first period and the second period may be used as "the time of the light load", at which the current increasing control is to be performed.

In addition, the above-described embodiment and the like have been described by taking, as an example, the case in which the receiving current (the DC receiving current Idc) after the rectification by the rectification circuit 21 is detected by the current detection section 22, and but is not limited thereto. For example, the receiving current (the AC receiving current Iac) before the rectification by the rectification circuit 21 may be detected and used for the current increasing control. Alternatively, a current (a load current) flowing to the battery 25 may be detected as the receiving current. However, it may be said that it is desirable to detect the DC receiving current Idc, because it is easier to detect the DC receiving current Idc than the AC receiving current Iac. It is to be noted that, in the above-described embodiment and the like, the dummy load circuit 23 as well as the current increasing control sections 23A and 23B are each disposed on the subsequent stage side of the rectification circuit 21, but the positions thereof are not limited thereto. For example, these sections each may be disposed on a preceding stage side of the rectification circuit 21.

In addition, the above-described embodiment and the like have been described by taking mainly the case in which only one electronic unit is provided in the feed system as an example. However, the technology is not limited thereto, and a plurality of (two or more) electronic units may be provided in the feed system.

Moreover, the above-described embodiment and the like have been described by taking the charging tray for the small electronic unit (the CE device) such as a mobile phone, as an example of the feed unit. However, the feed unit is not limited to such a home charging tray, and may be applicable to battery chargers of various kinds of electronic units. In addition, it is not necessarily for the feed unit to be a tray, and may be, for example, a stand for an electronic unit such as a so-called cradle.

It is to be noted that the effects described in the present specification are only examples, and the present technology may have other effects without being limited thereto.

It is to be noted that the present technology may be configured as follows.

(1) An electronic unit including:
a power receiving section configured to receive electric power fed from a feed unit by using a magnetic field; and
a control section configured to perform, when a receiving current supplied from the power receiving section is less than a predetermined threshold current at a time of a light load, current increasing control to increase the receiving current to the threshold current or more.

(2) The electronic unit according to (1), further including a current increasing section including one or a plurality of dummy loads,
wherein the control section performs the current increasing control by utilizing one or more of the dummy loads.

(3) The electronic unit according to (2), wherein
when the receiving current is less than the threshold current,
the control section performs the current increasing control, by connecting one or more of the dummy loads to a point in a supply path of the receiving current, and controlling a current to flow to the connected dummy loads.

(4) The electronic unit according to (3), wherein the control section disconnects the dummy loads from the point in the supply path when a main load is set in a connection state.

(5) The electronic unit according to (3), wherein the control section disconnects the dummy loads from the point in the supply path when the receiving current is equal to or more than the threshold current, after a main load is set in a connection state.

(6) The electronic unit according to any one of (3) to (5), wherein
the current increasing section includes a plurality of types of the dummy loads different in magnitude of load from one another, and
when the receiving current is less than the threshold current,
the control section connects, to the point in the supply path, the dummy load of a type that is selected from the plurality of types of the dummy loads according to a magnitude of the receiving current.

(7) The electronic unit according to (6), wherein the control section connects the dummy load to the point in the supply path, the connected dummy load being relatively large, as the receiving current becomes small.

(8) The electronic unit according to any one of (3) to (7), wherein
when the receiving current is still less than the threshold current, after one or more of the dummy loads are connected to the point in the supply path of the receiving current,
the control section additionally connects the dummy load to the point in the supply path, or switches the dummy load to the dummy load having a larger load.

(9) The electronic unit according to (1), wherein the control section includes,
a comparator configured to compare a magnitude of a receiving voltage corresponding to the receiving current, with a magnitude of a reference voltage corresponding to the threshold current,
an integrator configured to receive an output signal from the comparator, and
a transistor configured to operate according to control by the integrator.

(10) The electronic unit according to (9), wherein
when the receiving voltage is determined to be less than the reference voltage, based on the output signal,
the integrator performs the current increasing control, by connecting the transistor to the point in the supply path of the receiving current, and controlling a current to flow to the transistor.

(11) The electronic unit according to (9) or (10), wherein the reference voltage is a constant voltage.

(12) The electronic unit according to (9) or (10), wherein the reference voltage is a variable voltage that varies in connection with a change in the receiving voltage.

(13) The electronic unit according to any one of (9) to (12), wherein
the reference voltage is generated by dividing a predetermined fixed voltage or the receiving voltage, and
a value of the reference voltage is modifiable by changing a voltage division ratio in the dividing.

(14) The electronic unit according to any one of (1) to (13), wherein the time of the light load is either one of
a first period in which preliminary feeding of power lower than power of main feeding is performed by the feed unit, and
a second period in which a secondary battery serving as a main load is set in a connection state, and operation of charging the secondary battery is performed based on the main feeding, the second period following the first period.

(15) The electronic unit according to (14), wherein
while the charging operation is performed in the second period,
whether the receiving current is less than the threshold current is periodically determined.

(16) The electronic unit according to (14) or (15), wherein
after increasing the receiving current to the threshold current or more in the first period,
the control section notifies the feed unit of a request for start of the main feeding.

(17) The electronic unit according to any one of (1) to (16), wherein a value of the threshold current is modifiable.

(18) The electronic unit according to any one of (1) to (17), further including a current detection section configured to detect the receiving current,
wherein the control section performs the current increasing control, by using the receiving current detected by the current detection section.

(19) The electronic unit according to (18), further including a rectification circuit configured to rectify the receiving current, wherein the current detection section detects a receiving current after rectification by the rectification circuit.

(20) A feed system provided with one or a plurality of electronic units and a feed unit configured to feed the electronic units by using a magnetic field, each of the electronic units including:

a power receiving section configured to receive electric power fed from the feed unit; and a control section configured to perform, when a receiving current supplied from the power receiving section is less than a predetermined threshold current at a time of a light load, current increasing control to increase the receiving current to the threshold current or more.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic apparatus comprising:
control circuitry configured to:
   (a) initiate a preliminary feeding process to receive a power supply for an activation of the electronic apparatus,
   (b) provide electric current to a first load after a rectification of the electric current by a rectification circuit, the electric current increasing to a first current value,
   (c) measure a first value related to the first current value,
   (d) provide the electric current at least to a second load after the rectification of the electric current by the rectification circuit, the electric current increasing to a second current value that is larger than the first current value,
   (e) measure a second value related to the second current value, and
   (f) initiate a main feeding process to supply power.

2. The electronic apparatus according to claim 1, wherein a threshold value to control a power transmission from the feed unit to the electronic apparatus is associated with the first current value and the second current value.

3. The electronic apparatus according to claim 2, wherein the first current value, the second current value, and the threshold value are associated by satisfying the follow equation:
   the first current value<the threshold value<=the second current value.

4. The electronic apparatus according to claim 2, wherein the threshold value is a variable value determined based on a third value related to a received voltage by the electronic apparatus.

5. The electronic apparatus according to claim 1, wherein a main load comprises a battery.

6. The electronic apparatus according to claim 1, wherein the rectification circuit is coupled between a first node to which a power receiving coil is connected, and a second node to which the first load and the second load are connected.

7. The electronic apparatus according to claim 1, wherein the control circuitry is configured to control a detection circuit which measures the first value and the second value.

8. The electronic apparatus according to claim 7, wherein the detection circuit is configured to measure the first value and the second value as current values.

9. The electronic apparatus according to claim 8, wherein the detection circuit is configured to measure the first value and the second value as voltage values respectively relating to the first current value and the second current value.

10. The electronic apparatus according to claim 2, wherein the control circuitry is further configured to determine whether the first current value is smaller than the threshold value after the step of (c).

11. The electronic apparatus according to claim 2, wherein the control circuitry is further configured to determine whether the second value is smaller than the threshold value after the step of (e).

12. The electronic apparatus according to claim 11, wherein the control circuitry is further configured to proceed to the step of (d) only when the second value is determined smaller than the threshold value, after the step of (c).

13. The electronic apparatus according to claim 1, wherein the first load and the second load are dummy loads implemented within the electronic apparatus.

14. The electronic apparatus according to claim 13, wherein the control circuitry is configured to measure the received voltage after the rectification of the electric current by the rectification circuit.

* * * * *